(12) United States Patent
Revkov et al.

(10) Patent No.: US 11,176,738 B2
(45) Date of Patent: Nov. 16, 2021

(54) METHOD FOR CALCULATING THE COMFORT LEVEL OF FOOTWEAR

(71) Applicant: FITTIN, LLC, Voronezh (RU)

(72) Inventors: Andrej Anatolevich Revkov, Dolgoprudnyi (RU); Grigorij Vladimirovich Chujko, Voronezh (RU); Ivan Sergeevich Shchedrin, Voronezh (RU); Egor Andreevich Revkov, Dolgoprudnyi (RU)

(73) Assignee: FITTIN, LLC, Voronezh (RU)

( * ) Notice: Subject to any disclaimer, the term of this patent is extended or adjusted under 35 U.S.C. 154(b) by 0 days.

(21) Appl. No.: 16/818,647

(22) Filed: Mar. 13, 2020

(65) Prior Publication Data
US 2020/0364935 A1 Nov. 19, 2020

Related U.S. Application Data

(60) Provisional application No. 62/848,075, filed on May 15, 2019.

(51) Int. Cl.
| G06T 15/00 | (2011.01) |
| G06T 17/20 | (2006.01) |
| A43D 1/02 | (2006.01) |
| G06T 7/50 | (2017.01) |
| G06T 7/73 | (2017.01) |

(Continued)

(52) U.S. Cl.
CPC ............ *G06T 17/20* (2013.01); *A43D 1/025* (2013.01); *G06Q 30/0621* (2013.01); *G06T 7/50* (2017.01);
(Continued)

(58) Field of Classification Search
CPC .. H04N 13/239; H04N 13/246; H04N 13/257; H04N 13/271; H04N 13/275; H04N 13/296; G06Q 30/0631; G05B 2219/49023

(Continued)

(56) References Cited

U.S. PATENT DOCUMENTS 10,013,803 B2 * 7/2018 Shepherd ............... G06T 19/20
10,043,068 B1 * 8/2018 Hansen ................... G06T 7/60
(Continued)

FOREIGN PATENT DOCUMENTS

RU WO2018151620 A1 8/2018
RU 2684436 C1 4/2019

OTHER PUBLICATIONS

Lindorfer J, Kröll J, Schwameder H. Comfort assessment of running footwear: Does assessment type affect inter-session reliability? . European journal of sport science. Feb. 7, 2019;19(2):177-85.*

(Continued)

*Primary Examiner* — Phu K Nguyen

(74) *Attorney, Agent, or Firm* — Jie Tan; JT Law Services, PC

(57) ABSTRACT

A method for measuring shoe comfort level is provided. A 3D polygonal model of a foot is constructed from an array of images taken from multiple angles of the foot and leg. Each vertex point is loaded with foot anthropometric sensitive characteristics information. A 3D model of a shoe's inner space is constructed with a scanning device having various opening modes. Each of shoe inner space vertex points is complimented by shoe data such as material type, rigidity, structure, vamp and shoelaces. The 3D polygonal foot model and the vertex inner shoe space model are fitted together and the comfort level for the foot is defined with the simulation of movement.

19 Claims, 24 Drawing Sheets

(51) Int. Cl.
  *G06T 19/00* (2011.01)
  *G06Q 30/06* (2012.01)
  *G06T 15/30* (2011.01)

(52) U.S. Cl.
  CPC .............. *G06T 7/73* (2017.01); *G06T 15/30* (2013.01); *G06T 19/00* (2013.01); *G06T 2207/30196* (2013.01); *G06T 2207/30244* (2013.01)

(58) Field of Classification Search
  USPC ........................................................ 345/418
  See application file for complete search history.

(56) References Cited

U.S. PATENT DOCUMENTS

| | | | | |
|---|---|---|---|---|
| 10,299,722 | B1* | 5/2019 | Tran | A43B 3/0005 |
| 10,482,214 | B2* | 11/2019 | Cluckers | A43B 7/147 |
| 10,564,628 | B2* | 2/2020 | Hargovan | G06T 19/20 |
| 10,573,004 | B2* | 2/2020 | Husheer | G06K 9/00362 |
| 10,586,379 | B2* | 3/2020 | Wang | G06T 7/90 |
| 10,699,108 | B1* | 6/2020 | Hansen | G06Q 30/0241 |
| 10,776,533 | B2* | 9/2020 | Fisker | A61C 13/0004 |
| 2017/0272728 | A1* | 9/2017 | Rafii | H04N 13/239 |

OTHER PUBLICATIONS

Piped, Erald & Galantucci, Luigi & Kaçni, J & Shehi, E & Spahiu, Tatjana. (2014). From 3D foot scans to footwear designing & production. 10.13140/2.1.3172.6404.*

* cited by examiner

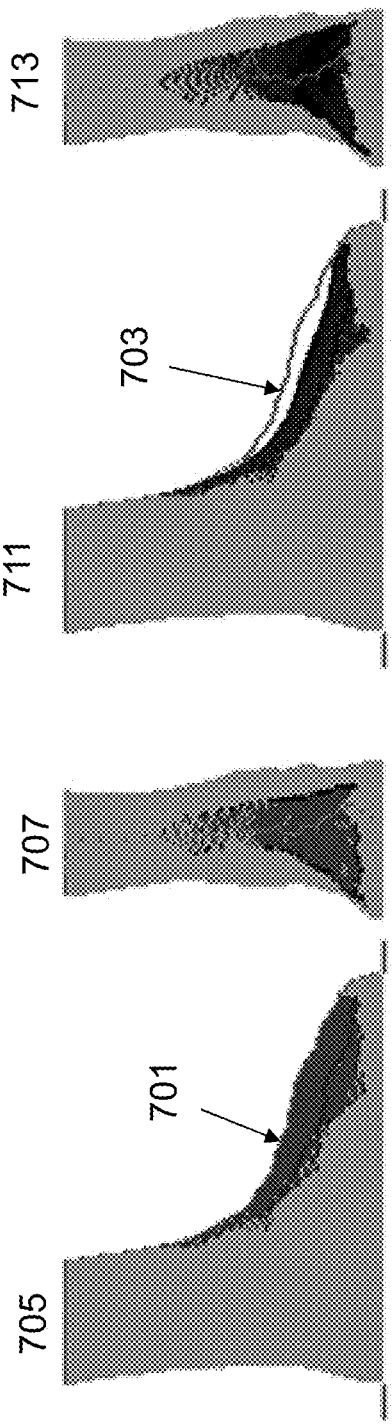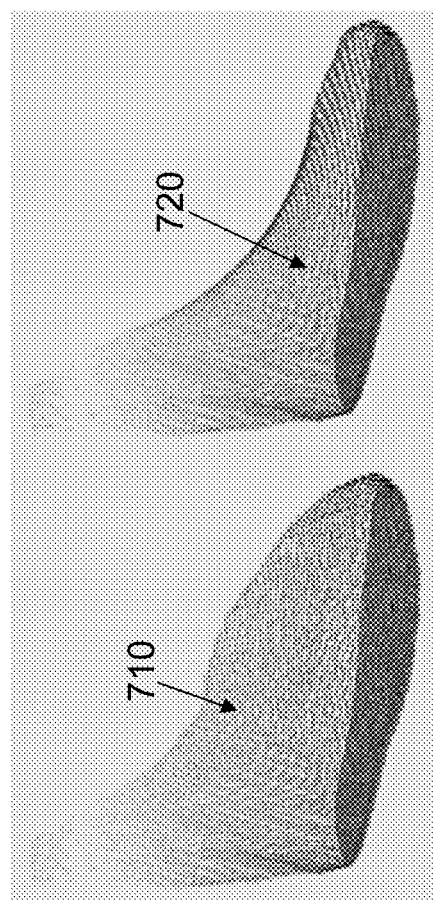
FIG. 7A
FIG. 7B
FIG. 7C

METHOD FOR CALCULATING THE COMFORT LEVEL OF FOOTWEAR

CROSS-REFERENCE TO RELATED PATENT APPLICATIONS

This application claims the priority of the U.S. Provisional Patent Application No. 62/848,075, filed on May 15, 2019, the entirety of which is incorporated by reference.

BACKGROUND

The present invention relates to a computerized method for virtual fitting and customized footwear making. More specifically, the present application provides a computerized method for measuring the comfort level of footwear and provides a method for creating a three dimensional topological model for the feet and shoes. The invention simplifies both the measuring of the foot, and the shoe 3D construction process. It increases precision and reduces manual labor in required to determine the dimensions of the feet and in construct of shoes of different types, ranging from boots to sandals without the need of a physical fitting.

DESCRIPTION OF THE RELATED ART

Footwear, like many other consumer products, are usually manufactured in mass scale, where personalization of fit and form exists only in incremental sizes. However many health problems are caused by ill-fitting shoes. The most common injuries directly attributed to improper footwear include blisters, severe foot pain, muscle and tendon inflammations. Imperfect footwear can also cause other ailments such as back pains. Seldom do people find a perfect fitting shoe, though they still waste a lot of time searching. Predictably many people will suffer various and serious pains as they age lacking comfortable footwear.

At the same time, it is increasingly convenient for consumers to buy shoes online. The unavoidable question is "how can retailers guarantee customers a proper fitting pair of shoes when shopping online?" One of the solutions is by a method of virtual fitting, a number of online merchant stores have already adopted this method. With a virtual fitting process through a computer network system, the biggest problem is physically measuring the feet and shoes digitally. In the healthcare field, there are special feet-scanning devices for making customized shoes for physical impaired or prosthetic limbs, but licensed healthcare professionals are required to operate those devices and they come with great additional cost and a long processing time. While these feet-scanning method provides sufficiently precise measurements, the high price associated prevents a vast majority of the market from attaining it.

A few mobile applications have also been developed that provide computerized measuring models. For example, U.S. Pat. No. 10,241,498 B1 describes a method for building a 3D foot model using a digital camera or any other device with an integrated image sensor (smartphone, tablet, etc.). A point cloud map is generated through the obtained images and is superimposed onto a pre-existing digital foot model. However, the resulting foot model does not fully reflect the shape of the foot and requires additional camera positioning during the scanning process. This is not user-friendly and creates a margin of error of around 3 to 5 mm, which does not provide enough precision for a proper shoe fitting.

US Patent Application Pub. No. 20170053335 A1 describes another method of measuring the foot. It involves capturing three-dimensional images of the foot and comparing them with an extensive database of stored shoe data. This method allows a user to use mobile devices, such as smartphones, iPhones, and digital mobile cameras. It generally has a better size approximation than conventional systems. The disadvantages of this method are that it is still too inaccurate, and too narrow in scope. In addition, the method does not work well if the collected images contain strong shadows, glares, poor lighting, or if the desired shoes are too complex.

Currently, the 3D modeling process using professional 3D image scanners is based on an additive principle, i.e. everything in the capture frame of the image scanner is included in the final 3D model. Consequently, the scanning process requires multiple steps and two stages. First, the scanning of the object, and then manually processing the data for 3D modeling. During this step it is necessary to remove the digital detritus, the remnants of extra elements on which the object is fixed. This involves a great amount of human interaction in the data collection, which means a high probability of human error.

Still some known shoe providing services give recommendations for footwear choices based on data from try-on experiences of other users with similar anthropometric measurements. These methods rely primarily on the subjective opinions of other people. There is little confidence in the accuracy of these measurements or that these opinions will apply to another person. Therefore, this method is not suitable for measuring the comfort level of a shoe for any particular consumer.

In these market conditions there is a high demand for cheaper, publicly available, and more efficient and precise methods for consumers to enjoy seamless online shoe shopping. With this available they can be confident that reasonable precision in the calculation of the comfort level of their footwear will be provided.

ASPECTS AND SUMMARY

The present application discloses an easy and user-friendly process for creating a virtual fitting and 3D construction of a foot, with sufficient precision, which subsequently provides the calculation of the comfort level of given footwear for a particular user in order to make a more informed purchase of personalized shoes.

In one embodiment, besides geometrical information parameters of the foot, such as form and size, the present method offer the construction of a topological model of the lower leg together a topological model of the footwear. The topological shoe model includes coordinates of image points in space and their relationships between them. The resulting topological computer shoe models contain multiple sets of additional topological characteristics of a footwear compared to traditional methods, including shoe expansion, rigidity, and areas of sensitivity on the foot.

In one embodiment, simulation of the shoe wearing process takes into consideration the different functional uses of the shoes, such as running sneakers, dress shoes, boots etc.

In one embodiment, the 3D model reconstruction of a user's foot is based on camera scanning both the foot and the shin, on which the length, circumference and volume are calculated.

In one embodiment, an inner shoe surface model is reconstructed for the shoe wearing process, the model takes into consideration the inner spatial surface of a shoe, the material, extension rigidity, the make and design features, and the structures of the shoe. The inner spatial surfaces of the user's worn footwear are also measured to provide shoe deformation and wearing habit data comparison, providing a total comfort level measurement at a personal level.

In one embodiment, server modules are provided to access footwear warehouse databases, databases of three dimensional leg-foot models, and/or databases of three dimensional models of the footwear inner surfaces. Users can have access to the data through different ways: through a mobile application, or using a website on the Internet. Server modules are further constructed for comparing a three dimensional foot model with a three dimensional model of the inner surface of specific footwear.

In one embodiment, shoe materials of different pliability are applied to a footwear model to accommodate the effect that shoe material has in the shoe design and how it modifies the foot comfort level. For example, a shoe seam stitch will not stretch, whereas soft fabrics will stretch, which will affect the feel and comfort.

In one embodiment, the comfort level of a shoe is visually displayed to the user by different colors. Such visualization is intuitive and easily understood.

In one embodiment, a personalized 3D foot model of a user is constructed by collecting photo images of the foot from several different angles against a flat reference object of known shape and size, by which the camera position and orientations are determined.

In one embodiment, a personalized 3D foot model of the user's feet is constructed by gradually cutting off the excessive data from areas initially included during the 3D modeling process, using foot contour image data identified in previous steps.

In one embodiment, the contour in the images of a flat reference object of known shape and size is identified through a repetitive process of comparing the predicted contour on a template that consists of several rows of points. The compliance criterion is calculated as the difference in brightness between the two nearest points of the inner and outer rows.

In one embodiment, a closed foot outline in the images is identified by using particle dynamics technique, by which the boundary between the foot area and the background is presented in the form of a set of multiple sequentially located digital points that form a closed foot outline and that preserve the connectivity of the contour under conditional forces. For example, under a conditional force this set of closed points will move together to a place of significant change in brightness, thereby forming a closed contour that circumscribes the simply connected foot area. A closed contour provides information that extra noise will not come into the final model, thus there is no need for post-processing.

In one embodiment, topological model of a shoe is provided by using an optical sensor device to obtain the inner surface of a shoe and by taking into consideration of the shoe material and designs.

In one embodiment, a personalized shoe comfort level is measured by fitting the personalized foot model into a particular topological shoe model under various foot motions, including walking and running.

In one embodiment, a personal shoe comfort level is measured by mapping calculated comfort scores to various areas of the foot model, producing a visual image of colors per the comfort of the affected foot by a particular shoe.

In one embodiment, the inner surface model of a shoe is achieved through the use of a scanning device having multiple flexible probes and a camera that measures the shape, dimensions, and elastic properties of the inner surface of the shoe. When the device moves inside a footwear, the camera, with the help of probes, creates a uniform stress state on the measured surface, it receives spatial data on the flat marking strip from indicators located on the probes. Based on the collected data, a three-dimensional model of the shoe's inner surface is constructed. Elastic properties of the show inner surface are obtained by scanning the same shoe object with a different force and measuring the modulus of the difference in the final and initial dimensions of the deformed inner surface.

In one embodiment, a personal shoe comfort level is measured by zooming out the foot model and placing it into the inner surface model of the shoe.

In one embodiment, a client module in the form of a mobile application is provided for transmitting the foot-leg images to the server; connected with the client module, a server module is provided for the construction of the three dimensional feet models using the images.

In one embodiment, a second client module is provided for inserting the images of the inner surface of the footwear from a scanning device. A computer server module for the building of a 3D inner footwear surface is connected with the second client module.

In one embodiment, at least two databases are provided: one database with information about the footwear including footwear inner surface, three-dimensional models, and one database with information about users, including three-dimensional foot models. A server module is provided for comparing the three dimensional foot-leg models with the three dimensional model of the inner surface of specific footwear. A knowledge base and a computer module are provided for dispatching the fitting results to the customer devices.

The above and other aspects, features and advantages of the present invention will become apparent from the following description and the accompanying drawings with reference numbers designating the corresponding parts.

BRIEF DESCRIPTION OF THE DRAWINGS

FIG. 7A to 7C illustrate the process of further refinement of the obtained 3D foot voxel model of FIG. 6F by removing excessive volume from the instep, in accordance with this application.

DETAILED DESCRIPTION OF THE PREFERRED EMBODIMENTS

Figure 1D:
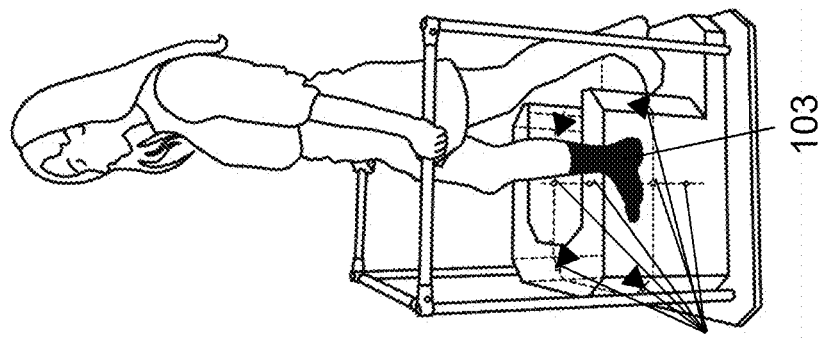
FIGS. 1A, 1B, 1C and 1D illustrate an example of measuring process for a user's foot and shin in accordance to this application.

Reference will now be made in detail to embodiments of the invention. Wherever possible, same or similar reference numbers are used in the drawings and the description to refer to the same or like parts or steps. The drawings are in a simplified form and are not to precise scale. The word 'couple' and similar terms do not necessarily denote direct and immediate connections, but do describe connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

The terms "module" and "client module", "server", "system" and "database" are all known terminology in software and computer network field, and are herein used in the same ordinary meaning of software technology as they are used in describing computer network and software function and structures. Thus the terms include the necessary computer hardware, processors, memory chips and input and output devices and other electronic devices that enable specific software and hardware to function as they are designed that satisfy the requirement of 35 USC 101 to generate a visible and tangible result on screen or on paper.

Similarly, the software elements of the present invention may be implemented with any programming or scripting language such as C, C++, Java, COBOL, assembler, PERL, Python or the like, with the various algorithms being implemented with any combination of data structures, objects, processes, routines, or other programming elements. Further, it should be noted that the present invention may employ any number of conventional techniques for data transmission, signaling, data processing, network control, and the like.

The particular implementations shown and described herein are illustrative of the invention and its preferred mode and are not intended to otherwise limit the scope of the present invention in any way. Furthermore, the connecting lines shown in the various figures contained herein are intended to represent exemplary functional relationships and/or physical couplings between the various elements. It should be noted that many alternative or additional functional relationships or physical connections may be present in a practical implementation in accordance with the principles of the invention.

Communication between user devices and the server system is accomplished through any suitable communication means, such as, for example, a telephone network, public switch telephone network, intranet, Internet, extranet, WAN, LAN, personal digital tablets, cellular phone, kiosk, online communications, off-line communications, wireless communications, satellite communications, and/or the like. A person skilled in the art will also appreciate that any databases, systems, or components of the present invention may consist of any combination of databases or components at a single location or at multiple locations. Each database or system will include any of the various suitable security features, such as firewalls, access codes, encryption, de-encryption, compression, decompression, and/or the like.

The present invention is described below with reference to the block diagrams and flowcharts in the figures to illustrate methods, apparatus (e.g., systems), and computer products according to various aspects of the invention. It is contemplated that each functional block individually in the block diagrams and the flowchart illustrations, and the combinations of the individual functional blocks, are implemented by computer program instructions to generate a computer product. These computer executive instructions may be stored on a physical disk or a USB drive or may be installed onto a general purpose computer, a special purpose computer, or other programmable data processing apparatus to produce a special machine in which the computer instructions will execute to perform the functions specified in the flowchart block or blocks and produce a tangible results that can either be printed out or stored on a hard disk to be transported to another physical place.

As used herein, the terms "user" and "participant" shall interchangeably refer to any person, entity, organization, machine, hardware, software, or business who accesses and uses the system of the invention, including retailers, manufacturers, and third-party providers. Participants in the system may interact with one another either online or offline. As used herein, the term "online" refers to interactive communications that takes place between participants who are remotely located from one another, including communication through any of the networks or communications means described above or the like.

As used herein, the terms "purchaser", "customer", "consumer", "user" and "participant" may be used interchangeably with each other, and each shall mean any individual person who uses a consumer or user ID to participate in the present system. A "consumer ID" or "user ID", as used herein, includes any device, code, or other identifier suitably configured to allow the consumer to interact or communicate with the system. Additionally, a "consumer ID" or "user ID" may comprise any form of electronic, magnetic, and/or optical device capable of transmitting or downloading data from itself to a second device which is capable of interacting and communicating with such forms of "consumer ID" or "user ID".

The present invention belongs to a group of measuring devices and measurement processes, it can be used in footwear production to define the corresponding footwear product to an anatomical specifications of a foot in the shoe making process, and for making customized shoes in medical remedies. It can also be used in retail, for individual users to purchase shoes online after determining whether the online product meets the characteristics of the customer's feet.

In the medical field there are methods for defining the conformity degrees of a footwear to the anatomical specifications of a foot by scanning the legs or feet with a complicated device that most consumers cannot afford. Simpler, but more widely used, methods that make use of mobile applications to measure the dimensions of feet, lack the necessary levels of precision. Generally, such 3D model reconstructions of the foot are based on the modification of a template 3D foot model by matching it with the flat contours of the foot. As a result, the actual shape of the user's foot is not fully reflected in the foot model, generating a shoe measurement error of around 3-5 mm. An error of this degree can render the measurement useless. This present invention uses a different approach in building both foot models and shoe models that produce more accurate measurements both for the foot and for the shoe. Consequently, the comfort levels associated with a given shoe can be accurately calculated for each individual user.

The method and process described herein are not limited to mobile cameras, they also apply to images obtained by other devices, other cameras or any devices that are capable of capturing images. For reasons of simplicity, the example given is based on a mobile phone process. The described method for constructing a 3D foot model is based on a series of foot images taken from multiple different angles. The detailed image processing is also described in Russian Patent Application Pub. No. RU2684436 C1 to Revkov Andrey Anatolevich et al., the entirety of which is hereby incorporated for reference.

In reference to FIGS. 1A, 1B, 1C and 1D, a scanning process is described in order to obtain a full three dimensional model of the foot 103. A mobile application 101 is provided so that it can be installed on a user's mobile device 301A, for example, a smartphone. Mobile application 101 uses the camera 111 of a smartphone to take a series of images of the foot 103 at an angle 110 by which at least 10 cm of the shin 105 of the user is covered for imaging. The images can be taken through a continuous scanning movement 113 of camera 111, or one at a time at a series of different angles.

Figure 1C:
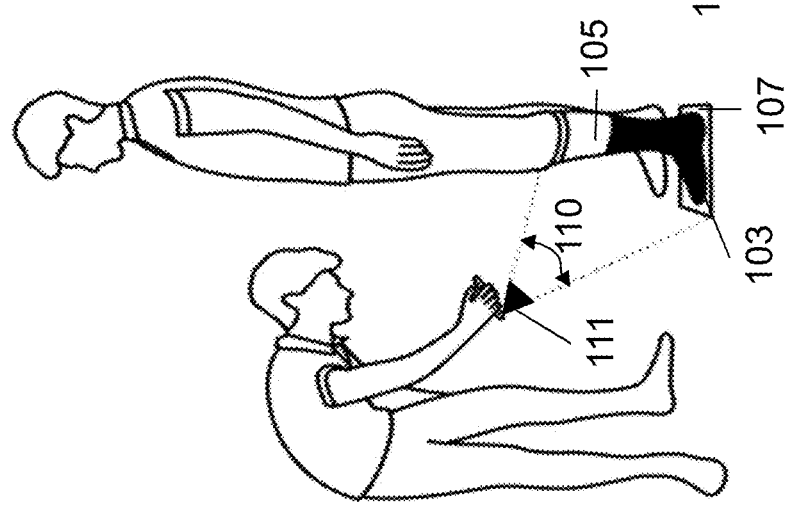
Figure 1B:
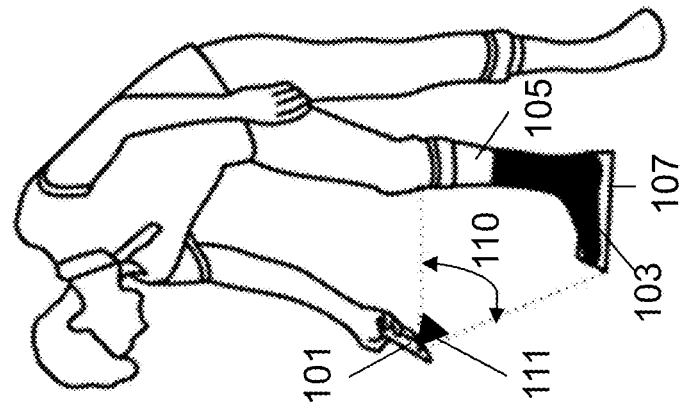
Figure 1A:
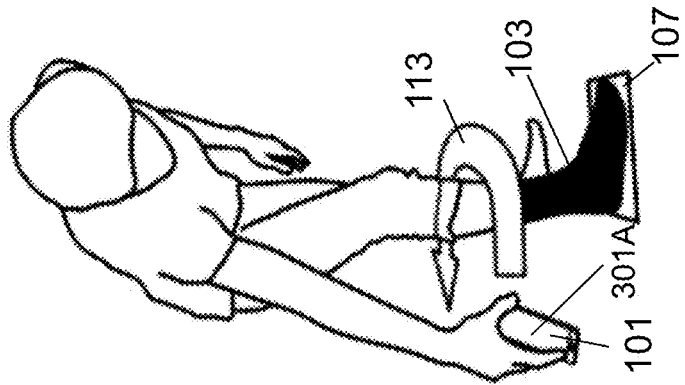

As shown in FIG. 1A, a user may self-scan foot 103 by placing foot 103 with exposed shin 105 in the middle of an A4 or US Letter sized white paper 107. The scanning camera 111 should move from one side of the heel to the opposite side of the heel as shown by reference number 113. As shown in FIG. 1B, in order to scan shin 105 properly, the user can lean towards the leg and take multiple shoots from different angles, equally distributed around a circular curve of about 200 degrees. The preferred camera scanning position should be around the knee level, this position covers angle 110 that will provide more precise image information for three dimensional foot model construction. The camera should be placed above the standing surface with a minimum 4 inches (10 centimeter) distance. The scanning process may be performed by another person (as shown in FIG. 1C) if the rotation and movement of the camera is cumbersome. The serial images may be taken from multiple cameras 115 as shown in FIG. 1D when the cameras 115 are mounted in a stationary device.

Figure 2D:
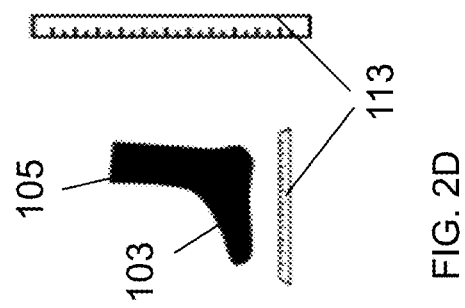
FIGS. 2A, 2B, 2C and 2D illustrate some of the possible reference objects for the creation of three-dimensional foot models in accordance with this application.
Figure 2C:
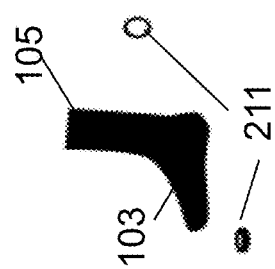
Figure 2B:
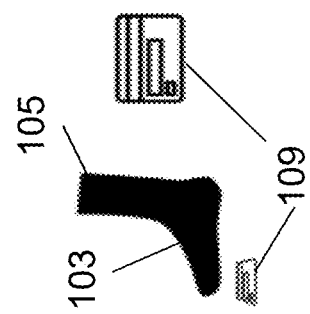
Figure 2A:
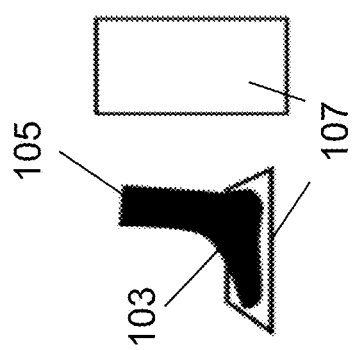

During imaging, the foot for measurement should be placed near a flat reference object of known size and shape, for example, an A4 or US Letter paper, a coin, a ruler, or a standard size business card. In reference to FIG. 2A, the placement of the foot 103 should be in the middle of A4 or US Letter sized white sheet of paper 107. Alternatively, a bank card 109 (FIG. 2B), or a coin 211 (FIG. 2C) or a ruler 113 (FIG. 2D) or other commonly used things of a fixed size and shape, such as a paper money, may be used as a size marker by being placed near to the foot. The size marker object (such as A4 or US Letter sheet of paper 107 bank card 109, coin 211, ruler 113) should be placed in such a way that it is shown in its entirety in each of the scanned images. For the alternative embodiment where a series of cameras are fixed on a stationary, the camera parameters are known, a digital analogue of flat reference object of known size and shape is stored in the program and embedded onto a real photo or video, no such reference object is needed to be used. Shin 105 should also be shown in each of the captured images in order to define the captured image size and shape. Around 2 to 12 images should be digitally captured and subsequently processed for the construction of a 3D foot computer model for foot 103.

Figure 3A:
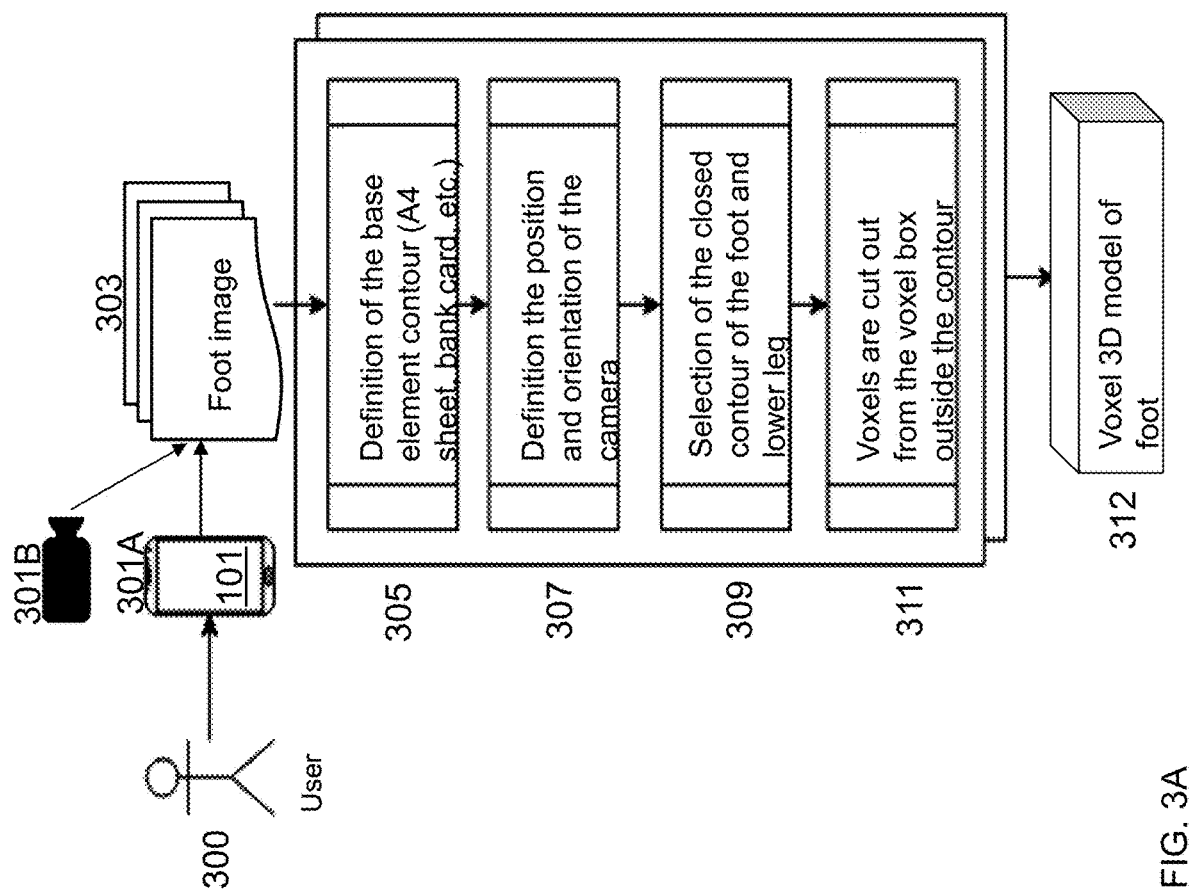
FIG. 3A illustrates a flowchart for the construction of a 3D model of a foot metrical model using multiple photo images of a foot, in accordance with this application.

In reference to FIG. 3A, after scanning a foot, a set of captured images 303 is collected by mobile application 101 on the smartphone (or any other device with an integrated image sensor). Alternatively images may be captured from multiple digital cameras 301B mounted a stationary.

The captured images 303 are further processed by app 101 through the initial processing steps from 305 to 311 for constructing a 3D voxel foot model 312. FIG. 3A shows a flowchart of image collecting, processing and generation of 3D voxel foot model. Step 305 is the process of defining the contours of a flat reference object in the images, i.e., the A4 or US Letter sheet of paper, the bank card, the ruler or other similar object. Step 307 is the process of defining the position and orientation parameters of the camera. Step 309 is the process of identifying the closed contour of the foot and shin in the images. Step 311 is the process of cutting off excessive voxels from an initial voxel box using the obtained foot contour to generate a 3D voxel model 312 of the scanned foot and leg.

In details for having a virtual fitting of a shoe, using a mobile phone as a scanning camera, user 300 first installs mobile scanning application 101 on smartphone 301A, he or she then performs the scanning process described in FIGS. 1A-2D. Multiple images 303 of the foot and shin from different angles are collected from the scanning. A minimum of 7 images are preferably needed, but if the memory capacity of the device and the bandwidth of the network is not a concern, preferably 12 images can be collected. The array of 7 to 12 sharpest and evenly distributed images are selected for further processing. The selected images 303 are transmitted to a server by application 101, through the Internet or a computer network or a cellular network. In order to have the images to be manageable as well as to minimize network traffic, all selected images 303 may be first resized by an multiple number of 2 times, or resized as many times as needed to reach a resolution of 480×640 pixels before sending them to the server. Images of higher resolution are cropped down in such a way that the A4 or US Letter sized sheet marker is situated in the center of each image.

Figure 3B:
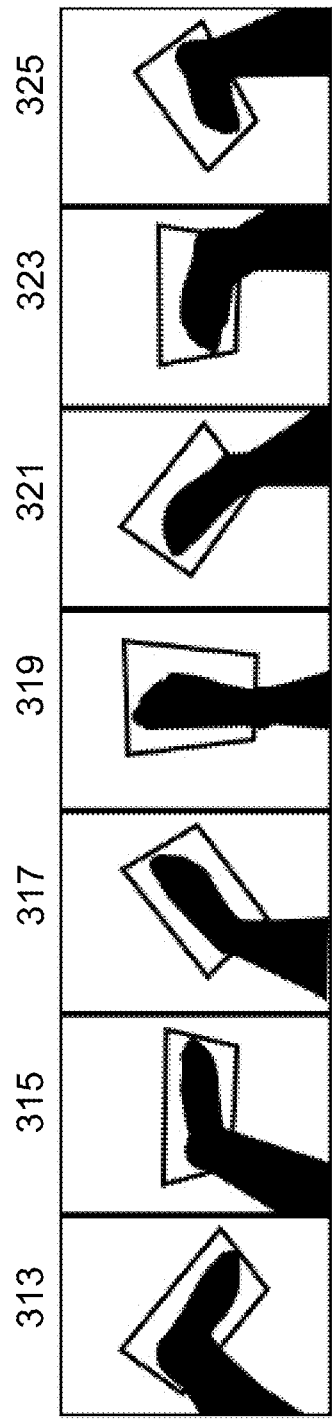
FIG. 3B shows an example of set of source images captured in black and white mode, obtained as a result of scanning with a mobile device, in accordance with this application.
Figure 3C:
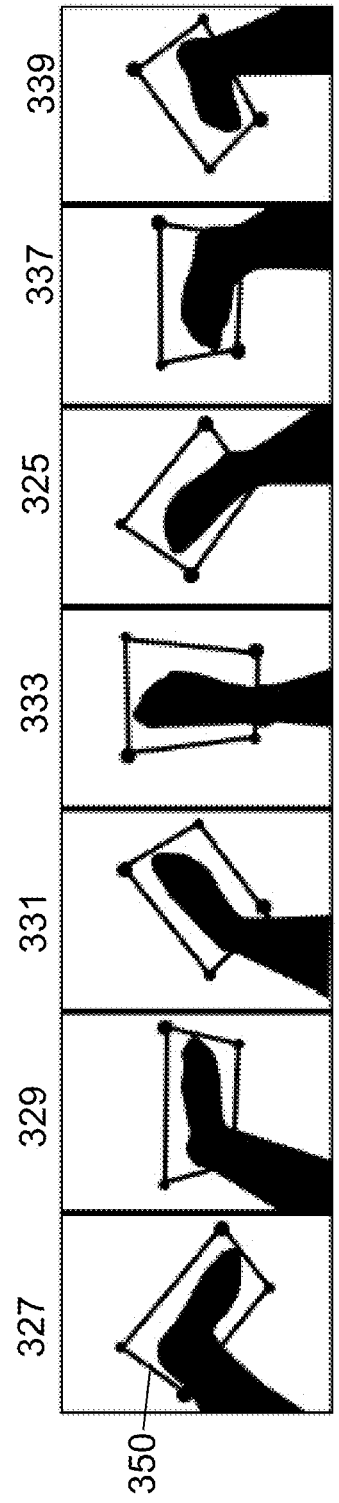
FIG. 3C shows an example of set of source images with recognized outline of the A4 paper, in accordance with this application.

In reference to FIGS. 3B and 3C, the processes of resizing and cropping the images 303 are accompanied by searching and defining the closed contour of the A4 or US Letter sized sheet size marker 350 (or any other size markers that are used). First, in reference to FIG. 3B, the collected images 313-325 are converted into gray-scale images. Then by gradually increasing image contrast with a shift in the average level, preferably after 10 to 20 iterations, the light areas are converted into white, the darker areas are converted into black, the shadows disappear and the blurry borders become sharp. With the sharp, high contrast, black and white images of the A4 sheet size marker (or other reference object in this matter), the size marker is shown as a defined black and white outline 350 in each of the images.

Figure 3D:
FIG. 3D illustrates how a flat reference object (an A4 or US Letter sized sheet of paper) is used in outline identification in accordance with this application.

Because the images are from sequential movements, the outlines of the A4 paper or other size marker can be identified with the Monte Carlo method. At step 305, a sufficiently large number of random sampling points in the images are selected and compared to a template contour pattern of a sheet of A4 paper (or other size markers) as shown in FIG. 3D. Two to 6 rows of points parallel to each edge of the template contour pattern of an A4 sheet (or other size marker), each row consisting of 4 to 40 number of points may be compared. The points in the image are matched according to intensity differences and row positions in the images. To accelerate the convergence of the Monte Carlo method, the desired camera parameter ranges are gradually narrowed. The number of elementary checks for finding the A4 paper contour with an acceptable accuracy is in the range of $10^5$ to $10^6$.

Figure 3E:
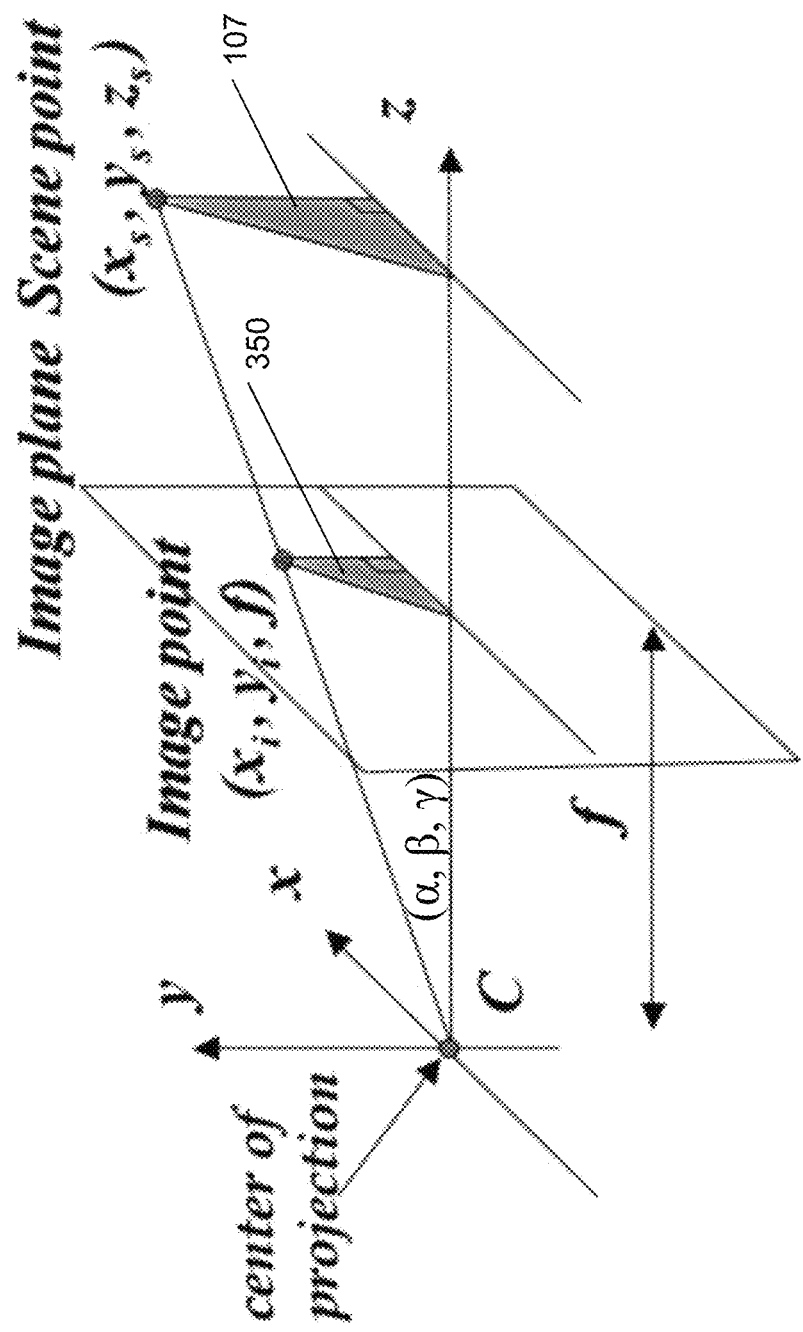
FIG. 3E illustrates the relation between a camera, an object and its image, in accordance with this application.

In reference to FIG. 3C, the camera position and orientation for each of the images 327-339 are determined as a function of the A4 paper (or other size markers) outline position in an individual image. The principle is illustrated in FIG. 3E, a triangle is used to represent the paper object, the camera parameters for each image can be determined by the A4 object 107 in its relationship to its captured image contour 350. Camera parameters consist of 6 degrees-of-freedom (DOF) which are made up of the rotation (roll, pitch, and yaw) and 3D position: coordinates in the x, y, z space and camera angles $\alpha$, $\beta$, $\gamma$, and focal length f. The task of determining the camera parameters (the x, y, and z coordinates in space, the camera orientation angles, $\alpha$, $\beta$, and $\gamma$, and the focal length, f) is done in reverse order: because it is necessary to determine the camera parameters with the predicted image by having the A4 paper match the real paper contour 350 in the photograph as much as possible. This is done by using a RANSAC (Random Sample Consensus) algorithm. Random data points of the A4 paper contour 350 are selected to generate a set of camera parameters through the Perspective-n-Point (PnP) estimation solution. This is done by a given set of 3D points (n) of an object in the world and the determination of their corresponding 2D projections in the images. The RANSAC generated camera parameters for each image are then used to generate a predicted image which is matched back with the collected real image data to check for consensus. At step 307, the calculated camera parameters in each image 327-339 that produce the highest consensus with the real image data are saved as the actual camera position parameters for each image. The saved camera parameters for each image are then used for carving out the 3D voxel model of the foot from a 3D voxel box in FIG. 6A-6E.

Figure 3F:
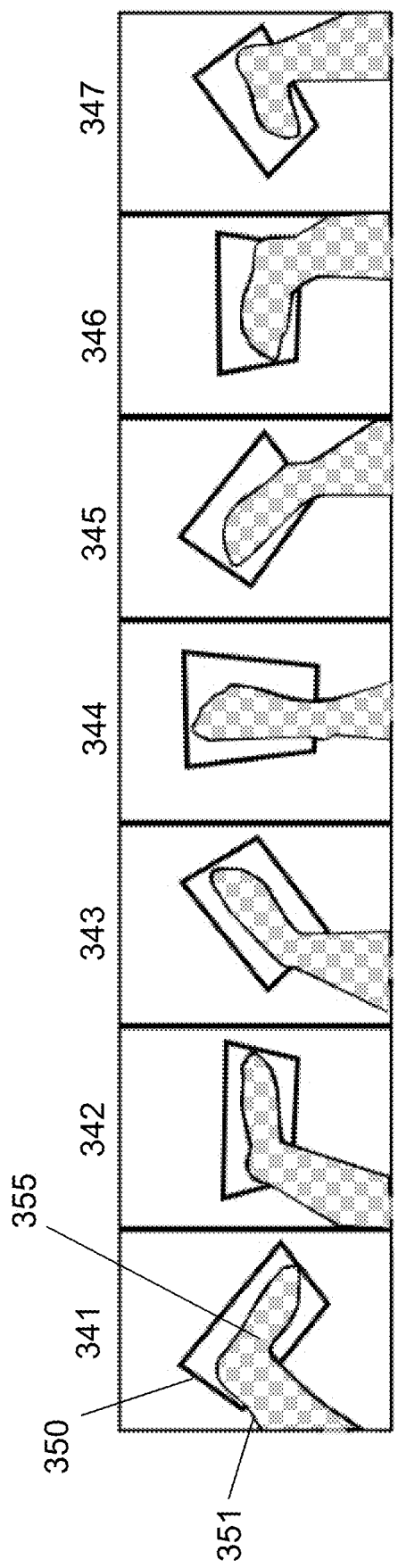
FIG. 3F illustrates the camera positions in the array of black and white images of a lower leg, processed in FIG. 3B, in accordance with this application.

In order to build a voxel 3D foot model, the next step is to determine the closed outline of the foot and the leg in each of the images. In doing this, the main problem is how to correct the shadowing from lighting conditions during the photography process. After converting the images into gray-scaled and then sharped with contrast shifting, the images are turned into black and white, the foot and shin line contour 351 is evident in the images 341-347 as shown in FIG. 3F. But as demonstrated in FIG. 4, in most photographs, the lighting conditions often produce shadows, especially in the area of the arch of the foot, making it difficult to define an accurate contour of the arch 355 of the foot with traditional methods.

Figure 4:
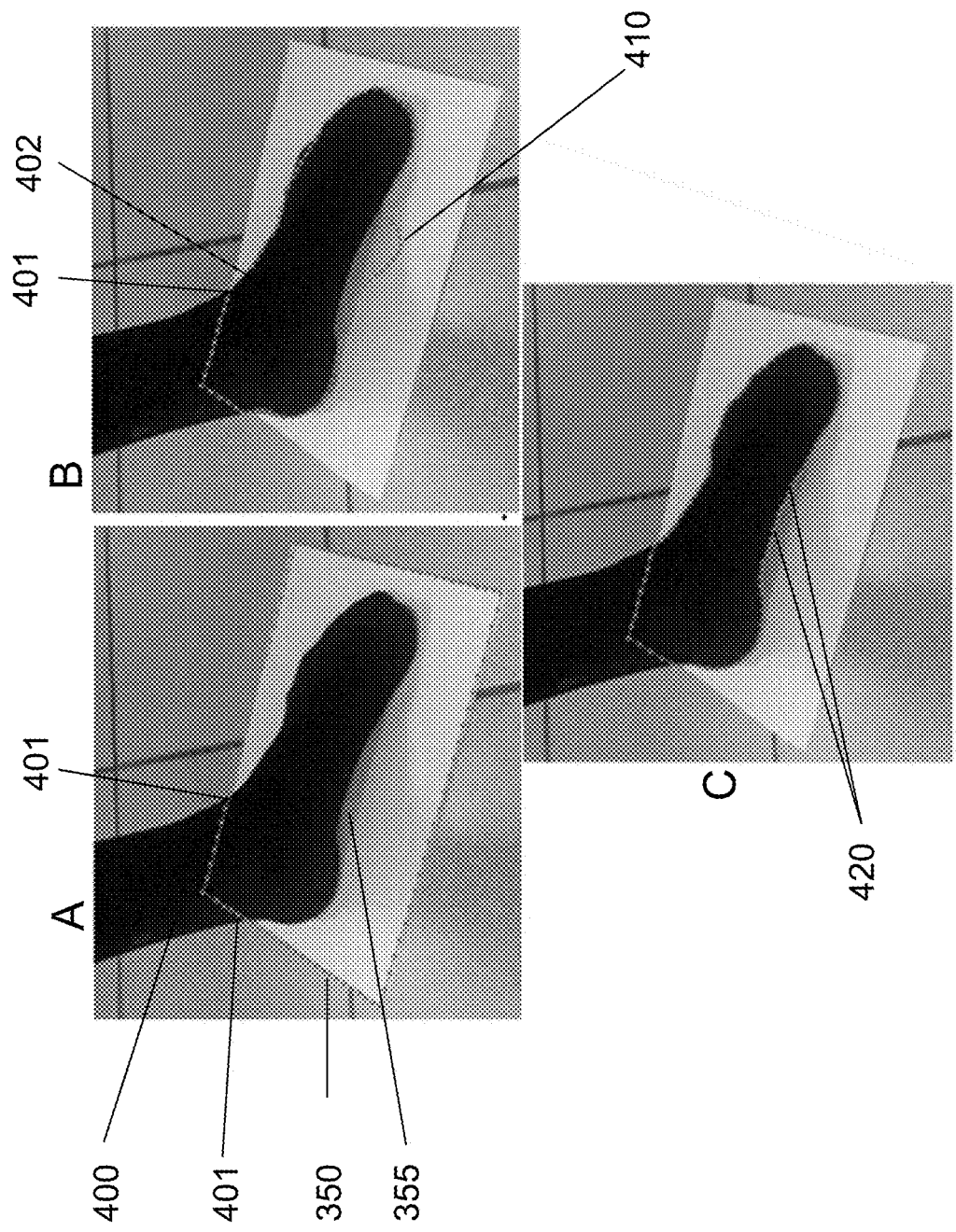
FIG. 4 illustrates the foot contour determination process using particle dynamics technique for each of the images, in accordance with this application.

In reference to FIG. 4, in order to distinguish the shadow effect from the real shapes of the foot in the present invention, techniques of dynamic particles is used in obtaining a closed contour of the foot and shin at step 309. The dynamic particle technique is based on the fact that when the closed foot contour in the image is pulled towards the foot area, the contour points that are initially located on the edges of the A4 paper size marker can be used for the calculation of the "physical interaction" and "mechanical movement" of these points. In dynamic simulation, the conditional forces of attraction acting between adjacent points cause the points moving towards the foot together while the distances between the points remain roughly constant. Therefore a force proportional to the numerical estimation of the second derivative of the brightness across the foot contour can be added to find the real arch of foot contour. To this end, the intensity of the point at the foot contour is read from the paired points outside and beyond the contour, distributed relative to the contour, in analogy with the A4 paper outline search step. Another option is to use the points from the darkest part of the foot image and push the points out to the foot contour.

As shown in FIG. 4, in Panel A, extending the points of the A4 paper outline 350 into the shin-foot image 400 identifies the points 401 located at the cross-section between shin-foot image and paper edges 350. In Panel B, using particle dynamics modeling, the interactions between neighboring points 401 and 402 are calculated. The physical interaction and mechanical movement of points 401 and 402 of the foot are subject to conditional forces of attraction that lead to tighten the points to the leg and maintain approximately constant distance between the points in mechanical movement. Stretching the initially identified foot outline (as shown with arrow 410) with an attraction force that is proportional to the second derivative of the image brightness intensity across the foot-paper joint area finds the foot outline points 420 that are related to the cohesive foot image (Panel C). The intensity of these points 420 is defined by reading a pair of points situated inside and outside of the foot contour outline distributed respect to their relation to the initial foot outline. This way the arch points 420 of the foot can be accurately identified in the images. The foot contour accuracy is further adjusted by converting the images into grayscale color, applying a median filter to smooth the image by applying a Kenny Boundary Detector (Canny filter), and by using a Sobel operator to calculate the gradient of brightness of the image at each point.

In the traditional foot image modeling, the shade 355 in the area of the arch of the foot is not well separated from the foot contour. Obtaining a precise arch line requires a special stand with good lighting. Without the precise definition of the arch of the foot in the foot image, the constructed foot models cannot be considered anthropometrically accurate. The described inventive methods allow separating a foot from its shadow with precision and in normal home conditions without special lighting. The method for constructing an accurate foot contour with the precise height of the arch of the foot in this invention also allows for the determination whether the foot is an anatomical anomaly, such as a flat foot or a deformed foot.

Figure 5:
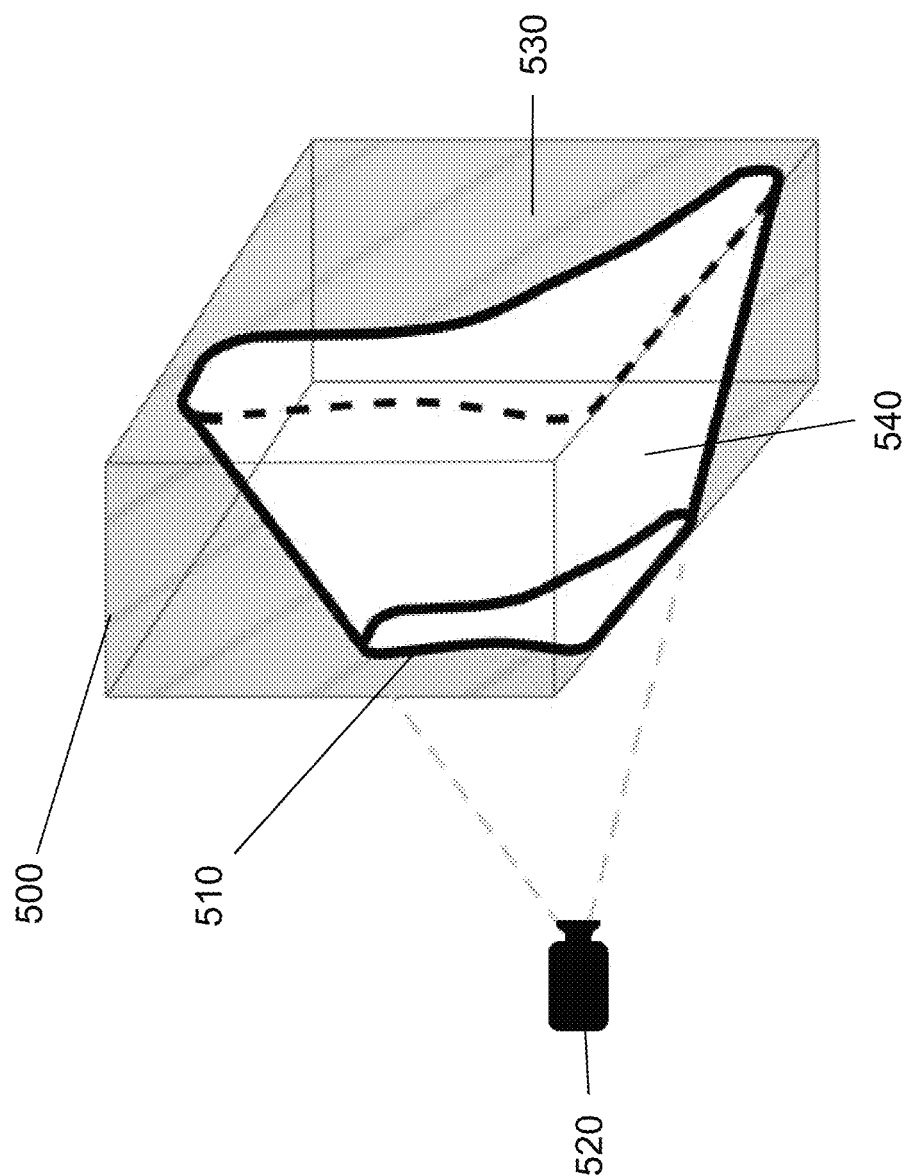
FIG. 5 illustrates the process of obtaining a 3D voxel model out of a voxel box using 2D foot contour identified from each image, in accordance with this application.

In reference to FIG. 5, the principle of cutting a voxel 3D foot model 312 from a parallelepiped-shaped voxel box 500 is shown. Much like a sculptor removes excessive material to create an artwork, with a center of projection at the point of camera location 520 and the guide of the 2D foot contour 510 identified from each image obtained in the previous step, excessive voxels 530 outside conical secant surface 540 are chipped away from voxel box 500.

Figure 6A:
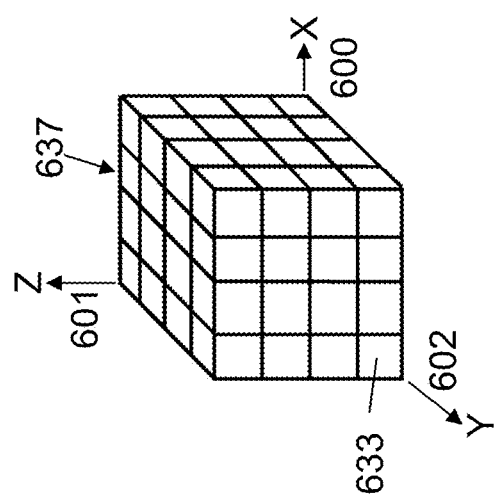
FIG. 6A to 6E demonstrate the 3D foot modeling process by carving off the excessive voxels from the voxel box using image projection, in accordance with this application.
Figure 6E:
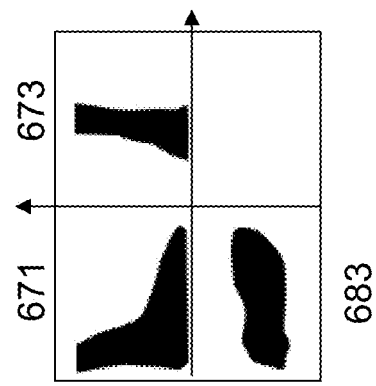
Figure 6D:
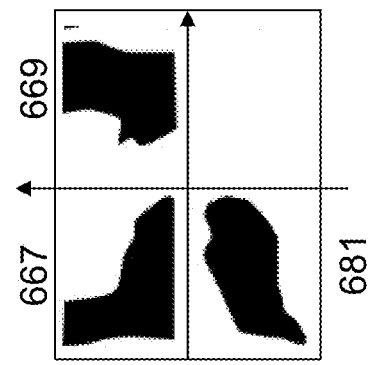
Figure 6C:
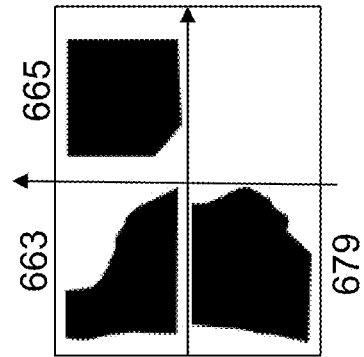
Figure 6B:
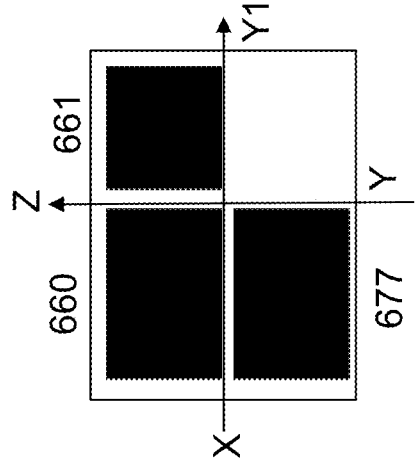

For building a voxel 3D foot model 312, the cutting off process of step 311 is illustrated through FIGS. 6A, 6B, 6C, 6D and 6E. FIG. 6A shows an initial voxel box 637 comprised of individual voxel 633, sitting on the X, Y, Z axes. FIG. 6B represents the projection of the original voxel box 637, where image 660 is the front view projection, 661 is the lateral view projection, 677 is the top view projection.

Figure 6F:
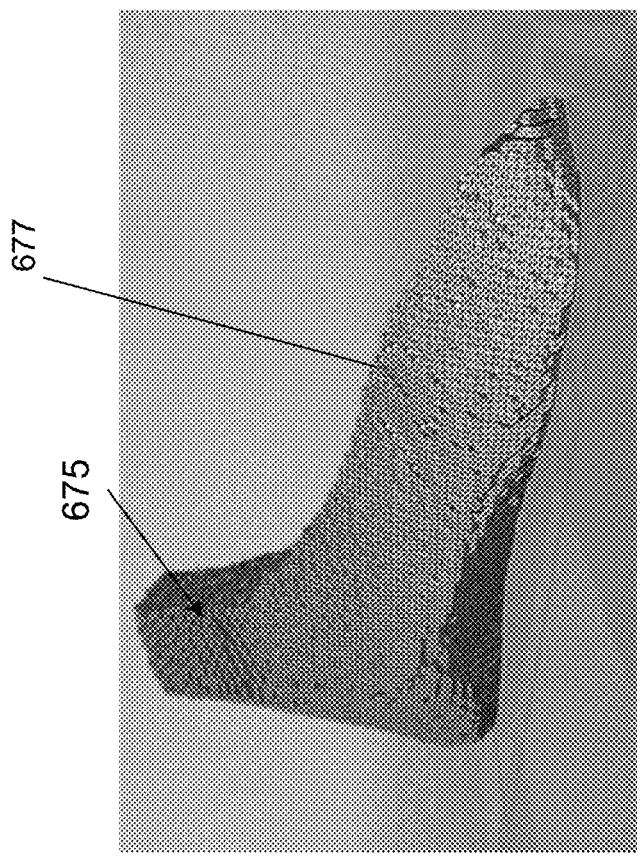
FIG. 6F shows an example 3D voxel model of a foot carved out of a voxel box, in accordance with this application.

FIG. 6C represents the views of the voxel model after chipping out the excessive voxels outside conical secant surface with the guide foot contour illustrated in image 315 of FIG. 3B, where image 663 is the front view projection, image 665 is lateral view projection and image 679 is horizontal view projection. FIGS. 6D and 6E represent the projection of the voxel box after further chipping out the voxels guided with the foot contours in images 319 and 325 of FIG. 3B where images 667 and 671 are the front view projections, images 669 and 673 are the lateral view projections, and images 681 and 683 are horizontal view projections respectively. As the excess voxels are gradually cut off from different angles as illustrated in FIG. 5 and in step 311 of FIG. 3A, a fairly accurate 3D-model voxel model of the leg 675 is formed (FIG. 6F). The obtained 3D voxel model is further converted into polygonal representations with additional smoothing and grid adjustments.

Because it is recommended to capture the foot images by moving a scanning camera in a smooth arc trajectory at knee height to speed up and simplify the process, the angle of the scanning device will cause the 3D voxel model be cut out with projections of the foot contour above the foot rather than in front of the foot. This leads to the appearance of a "ridge" or a sharp upper edge 677 in the instep area of the foot model, making the determination of this area less accurate than the other parts of the foot model, and the instep height can be overestimated. To correct the upper surface of the foot model and to eliminate the "ridge", a special algorithm was developed based on the interacting moving points technique (dynamic particles techniques).

Figures 13A, 13B:
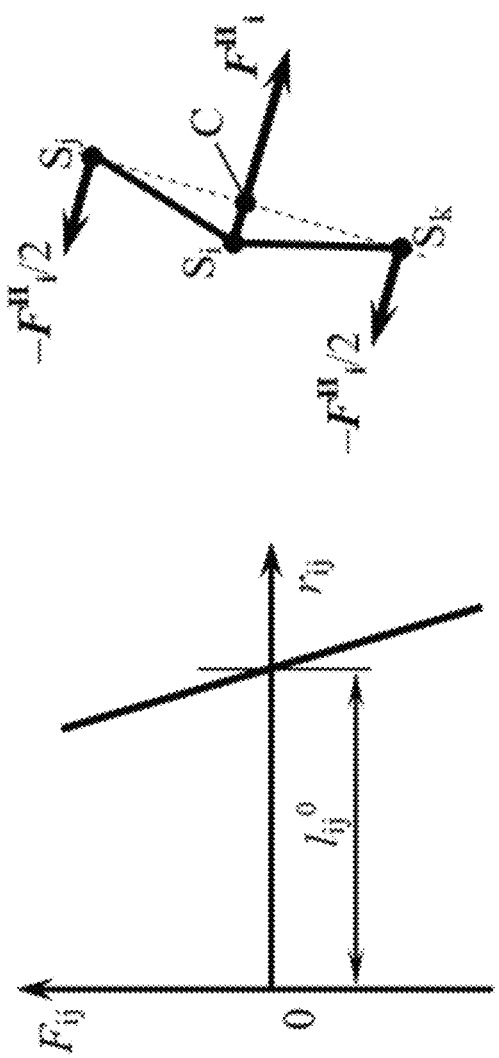
FIGS. 13A and 13B illustrate forces appearing after displacement of points on a topological model of the inner surface of the shoe when a foot model pressures against a shoe, in accordance with this application.

There are two types of forces between moving points: forces of attraction which tend to shorten the distance between points; and bending reduction forces, which tend to make the surface as smooth as possible (FIG. 13A and FIG. 13B). To remove the "ridge", first, the area above the foot that needs to be corrected is isolated, then the mechanical interaction and the movement of the surface points are calculated. The side view of the foot is used to ensure a precise restoration of the surface above the foot.

In reference to FIG. 7A to 7C, area 701 is a pre-allocated "ridge" above the foot. FIG. 7A shows three projection images 705, 707 and 709, projection 705 shows a "ridge" area 701 above the foot. It can be adjusted as shown by reference number 703 in FIG. 7B by applying forces of attraction and forces of bending. The resulting three projections 711, 713 and 715 are more accurate after the removal of the ridge 701. Voxel foot models with a ridge 710 and without a ridge 720 are shown in FIG. 7C for comparison.

Figure 8:
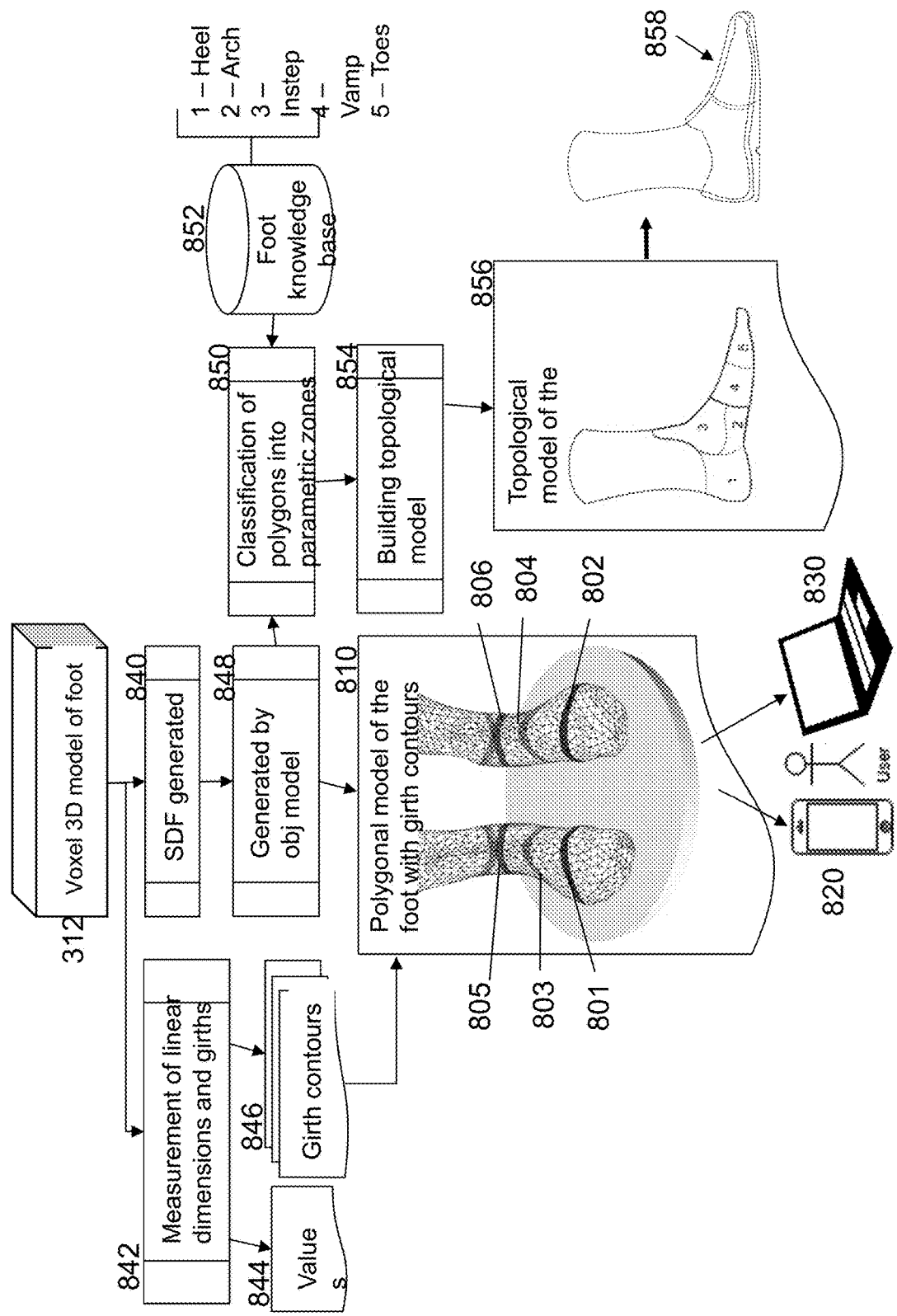
FIG. 8 shows a flowchart for creating a topological model of a foot using a foot knowledge database and the 3D foot model of FIG. 7A-FIG. 7C, converted from voxel to a polygonal format, in accordance with this application.

FIG. 8 shows a flowchart for the generation of polygonal and topological foot model from a 3D voxel foot model. The generated voxel 3D model 312 as shown in FIG. 3A is further used to generate the polygonal and topological model of the foot. In general, the field of space which will be filled with the foot area is first created. Then the key points from the 3D voxel foot model are placed on the outer surface of the field (the maximum gradients area) creating a uniform surface coverage. After that a Signed Distance Function (SDF) at step 840 is generated and the model is smoothed out. The smoothing step is regulated by a special parameter during the field creation. At step 848 using a set of obtained points and edges obtained from the 3D voxel foot model, triangles are constructed, and the data is converted to an "obj" format file at step 810. The 3D foot model is converted from the voxel format into a polygonal format for subsequent visualization and compact storage.

At step 842 the voxel 3D foot model is measured for linear dimensions and girths. The outcome are the values 844 and the contours of the girths 846. Further standard foot measurements for shoe making are obtained from the polygonal 3D foot model: ball girth 801 and 802, instep girth 803 and 804, ankle circumference 805 and heel diagonal 806. The foot model are also divided into five defined areas of foot sensitivity: the heel (1), the arch (2), the instep (3), the vamp (4), and the toes (5). Depending on the comfort level when pressing on each of these areas collected in foot knowledge database 852, each area is assigned with its own weight factor from steps 850, 854 and 856 for improving the footwear comfort level calculation on a footwear model 858. Besides spatial parameters the resulting topological foot model at step 810 comprises vertices and polygons. Then data on the affiliation of polygons to a particular parametric zone obtained in step 850 are applied to the polygonal foot model turning it into a topological 3D foot polygon model that comprises information about different foot sensibility areas. The entire foot data in "obj" format can be stored and accessed by the user through a smartphone 820 or a computer 830.

Figure 10A:
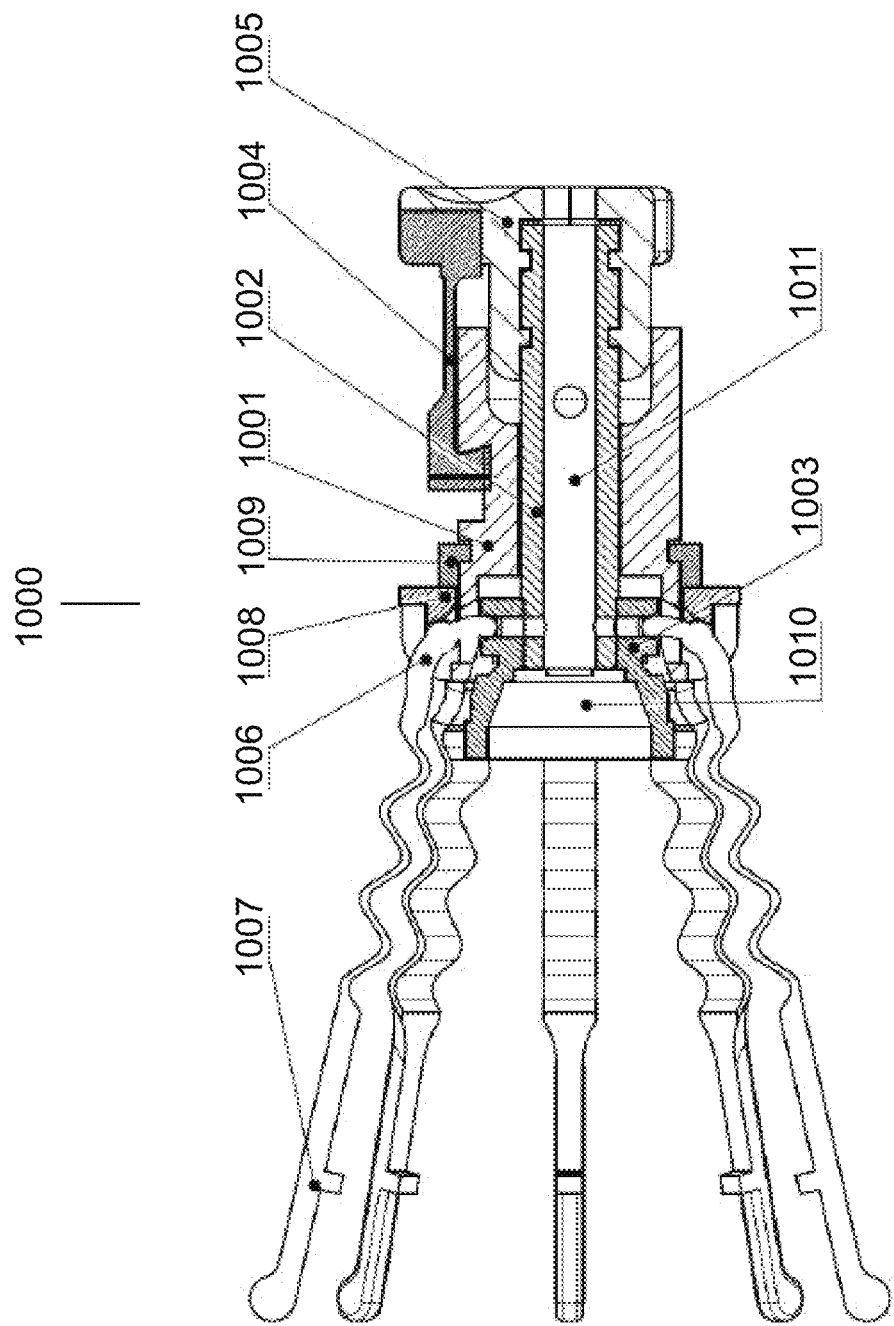
FIG. 10A shows a shoe inner surface scanning device, in accordance with this application.

After obtaining a topological 3D foot model of a user, in order to determine the comfort level of a given shoe to a given foot, we need to know the internal structure and dimensions of the shoe. A scanning device 1000 shown in FIG. 10A is introduced inside the footwear for the measurement of the internal surface of the shoe as demonstrated in FIGS. 10B and 10C. The structure of scanning device 1000 is described in WO2018151620 A1 to Chujko Grigorij Vladimirovich et al, the entirety of which is hereby incorporated for reference. Scanning device 1000 includes body 1001, spindle 1002, lens system 1003, key 1004, handle 1005, probes 1006 with color indicator 1007 at their tips for position identification, locking mechanism 1008 and fixing mechanism 1009, half rings, lens 1010, camera 1011 with a backlight connected to a computer. There is a mechanism allowing for altering the opening angles of elastic probes 1006 in order to apply stress to an elastic surface to be measured.

Figure 9:
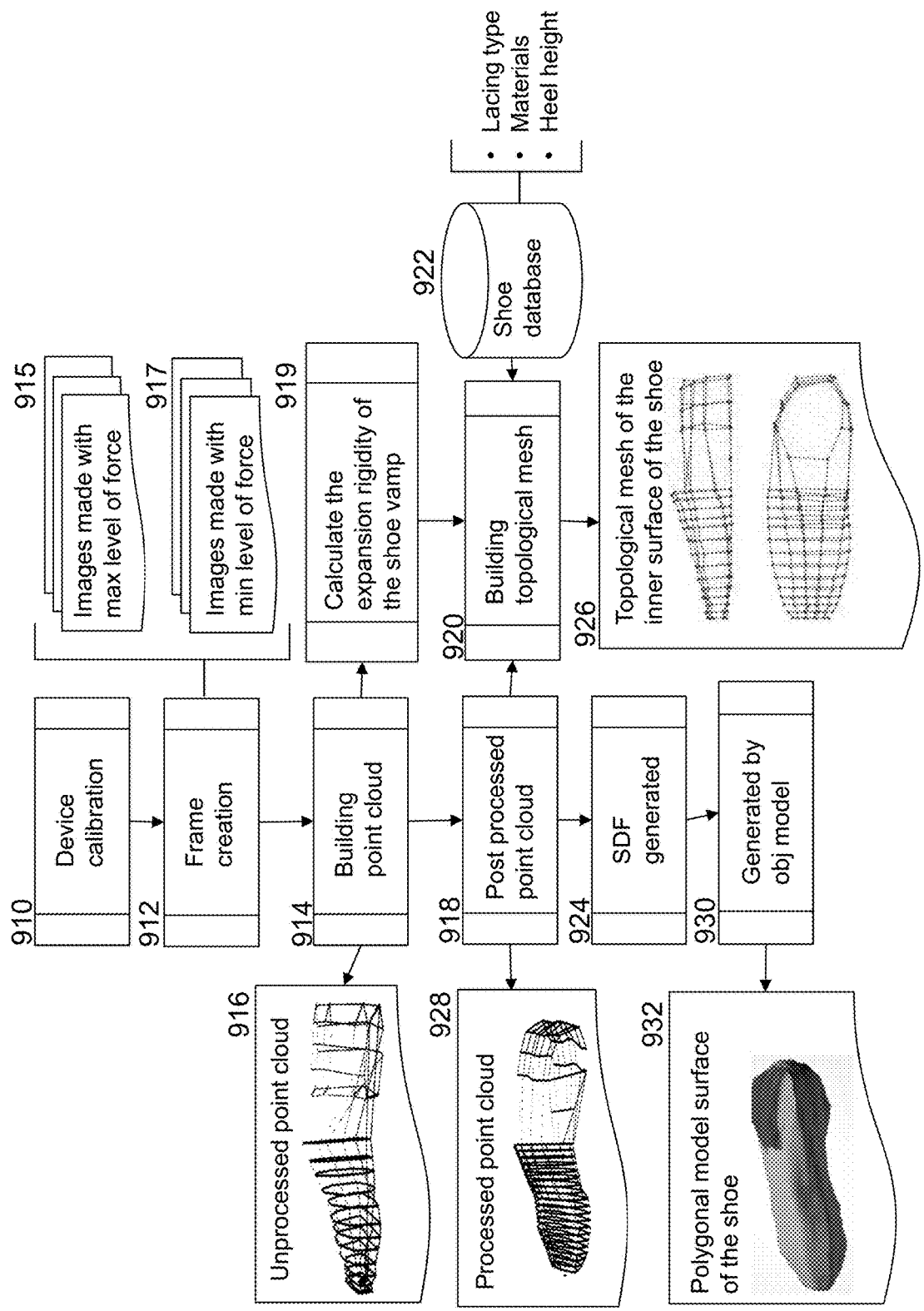
FIG. 9 shows a flowchart for constructing a topological model of a shoe, in accordance with this application.
Figure 10C:
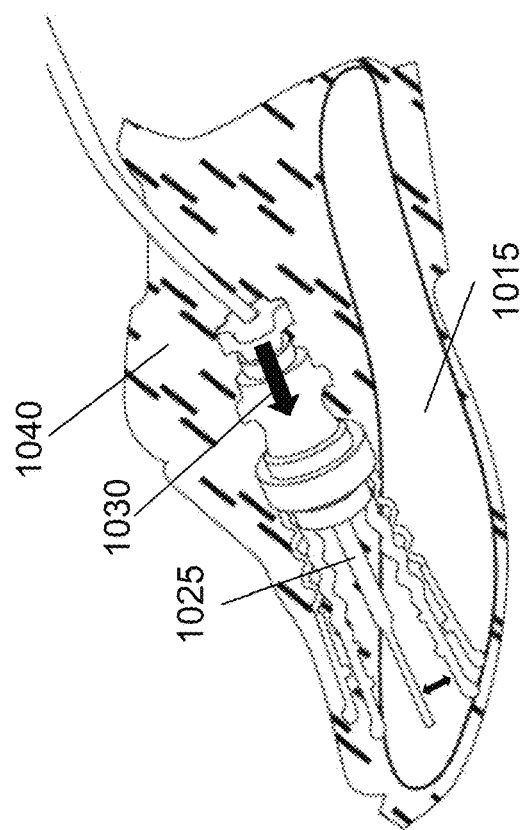
FIG. 10C shows an example of scanning process of the inner surface of a footwear with probes of FIG. 10A in the opened position in accordance with this application.
Figure 10B:
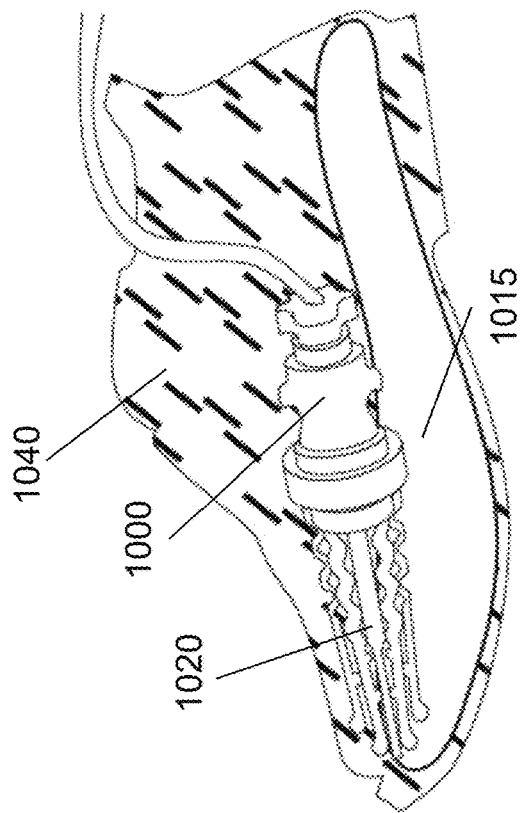
FIG. 10B shows an example of scanning process of the inner surface of a footwear with probes of FIG. 10A in the retracted position in accordance with this application.

In reference to FIG. 9, the flowchart for building digital topological models of the inner surface of the shoe is provided. The device 1000 is first calibrated in step 910. During calibration, the position of indicators 1007 on probes 1006 relative to the optical center of the camera is adjusted (FIG. 10B). At step 912 shoe scanning takes place and the images of the inner surface of the shoe are obtained with maximum pressure and an array of images 915 are obtained, wherein probes with indicators 1007 are in wide open mode (angle 100 degrees). The minimum pressure wherein probes with indicators 1007 are in half open mode (50%) and an array of images 917 will be obtained (FIG. 10C). After scanning an existing footwear a number of times using different pressure levels on the probes, the received images are transmitted to the server, the expansion rigidity of the shoe vamp can be calculated at step 919 by calculating the difference between the point clouds obtained with the maximum and minimum probe pressure.

Figure 10D:
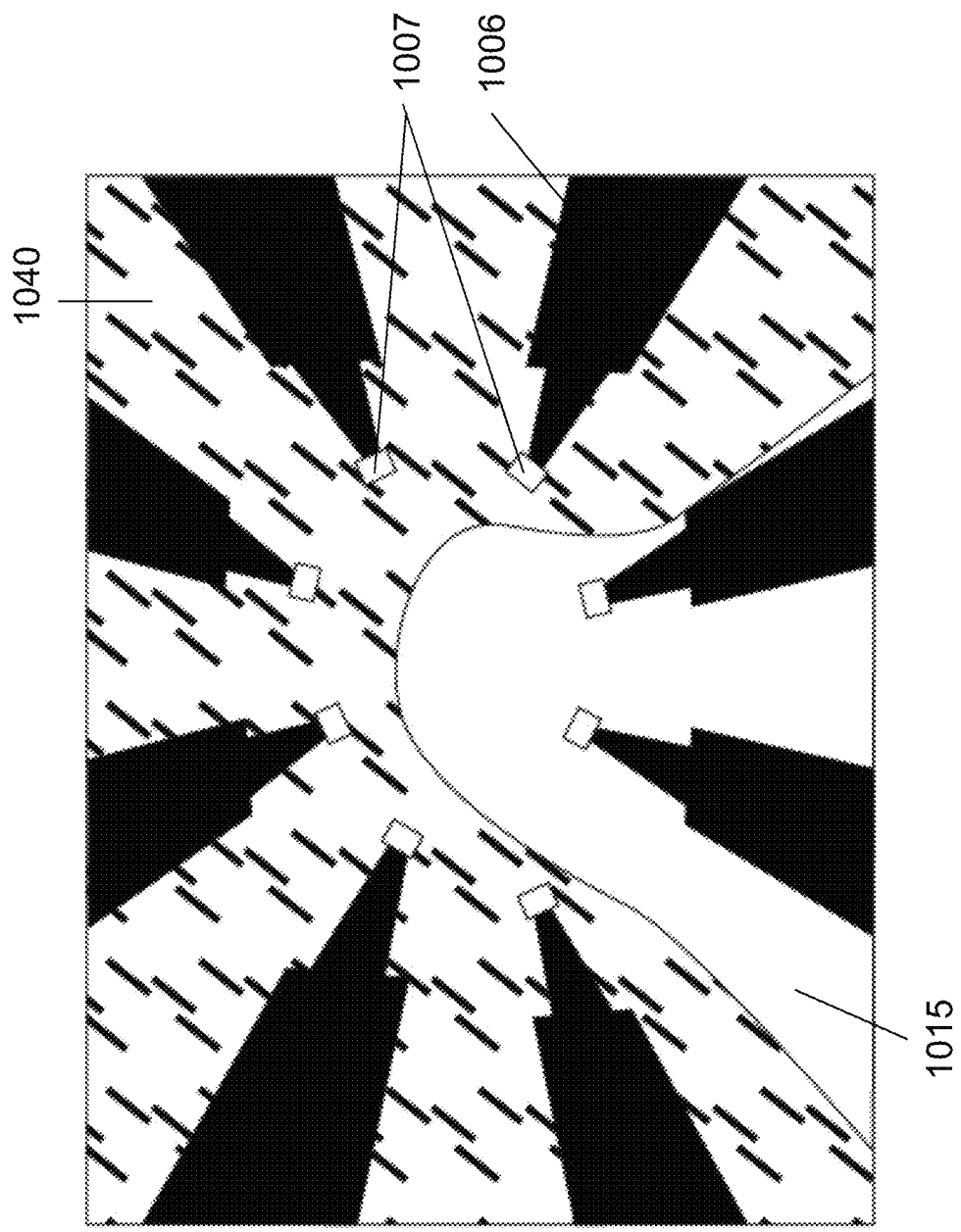
FIG. 10D shows an example of the taken image from the camera of shoe scanning device of FIG. 10A in accordance with this application.

As shown in FIG. 10D, for each frame three square fragments 1007 on the marker strip image will be identified: the main square fragment and two fragments bended upwards and one to the right in relation to the main one. According to $x\phi$, $y\phi$ coordinates of the three fragments on the flat marker strip, three coordinates of the optical center of the camera $x\vartheta$, $y\vartheta$, $z\vartheta$ and the orientation angles of the optical axis of the camera $\alpha\vartheta$, $\beta\vartheta$, $\gamma\vartheta$ are calculated. These six parameters provide accuracy when determining the position of probe ends inside a shoe. The points received for each of the image frames are combined into a point cloud at step 916 and reconstructed into the corresponding shape of the inner surface of the scanned shoe. The square fragments in the images are identified by the Monte-Carlo method with narrowing ranges, allowing for the determination of the $x\phi$, $y\phi$ coordinates of a fragment in the coordinate system of a marker strip and the dimension of a square shaped fragment $a\phi$. These parameters are linked with the camera x, y coordinates. The trapezoid parameters represent a distorted square fragment when viewed at an angle. The images of squares from the probe markers generated from different view angles are combined, the sum of probe squares of intensity differences of the corresponding pixels is used for each probe positions.

With indicators on the probes they allow for obtaining information about the sections of the inner surface in each image frame. At step 914, a sequential array of images, an array of sections of the inner surface are constructed into a point cloud 916. This point cloud 916 goes through post-processing at step 918, which includes procedures for thinning of the sections and uniform spreading along the length of the shoe, leveling of the sections and deleting the inside partition. By adding shoe database information 922 about lacing types, material types and heel height, a topological shoe mesh 926 is constructed. The results of this post-processing of the shoe generate a Signed Distance Function (SDF) at step 924, upon which a 3D polygonal shoe model 932 is constructed in obj format at step 930.

The scanning device is designed to scan the inner surface of any shoe. The scanning device can be used to scan shoes at a seller's warehouse, at a shoe factory, or privately at the buyer's home. However, the scanning device does not create the 3D model itself, it only sends the measurement data to the FITTIN® servers, where, based on the received data FITTIN® software creates the 3D model.

In different situations, the scanning device can be used by different people (scanners): by a staff member in a shoe store to attract a potential buyer, at a shoe factory by a shoe "tester" to check the quality, or at home by any person interested in buying footwear with a measured level of comfort. The user of the scanning device can also be a person who scans shoes professionally, for example a FITTIN® agent. All users of the scanning device must be connected to the FITTIN® service for the device to perform its function.

In reference to FIG. 10A, by pushing the handle 1005 of the scanning device 1000 opposite the lens 1010, the shanks of the probes 1006 move into the slots of the lens unit 1003, the opening angle of the probes 6 is reduced until they touch each other, pushing the elastic key 1004 into a status that causes the material to stress. As shown in FIG. 10B, when the device 1000 is placed inside a shoe 1040, probes 1006 are in retracted position 1020. By pushing handle 1005 towards lens 1010 (as shown arrow 1030 in FIG. 10C), probes 1006 are opened in position 1025 to the required opening angle by the force of elastic key 1004 which snaps and locks probes 1006, preventing them from bending when releasing the pushing force from handle 1005. Camera 1011 is then switched on, recording and transmitting the positions of the indicators 1007 relative to the marker strip 1015 to a computer. When the device is dragged inside a shoe, the probes 1006 apply a uniform pressure to the inner surface measuring the elasticity of the interacting surface. As the inside surface is scanned the sensed data and images of the shoe inner measurements are transmitted to a computer for processing. The computer then converts this information into a 3D model of the shoe.

The reading of the three-dimensional coordinates along each axis takes place as long as scanning device is moving along the interior surface of an object. The device is equipped with a video or photographic camera, which makes it possible to obtain information about the precise position of the indicator of a scanning probe in real-time in three planes. The camera 1011 together with the probes 1006 records a sequence of images of the inner space of the shoe 1040 in relation to a marker strip 1015. An example of the taken images is shown in FIG. 10D. The creation of the inner surface 3D model is not based on the pictures of the scanned shoe, but rather on the position indicators 1007 on the probes 1006 in relation to a flat marking strip. In addition, the probes, located within the scanned area, being in the converged position, uniformly stretch the shoe's material, which makes it possible to measure the shoe's original shape without causing additional deformation.

The camera 1011 collects information about the dimensions and the shape of the surface in sight, while probes 1006 sense and measure the elasticity of the measured surface. In use, the indicator on probes 6 read the three dimensional coordinates against the strip 1015 while the device travels the entire inside length of the footwear. With the integrated mini video camera 1011 with a backlight on the scanning device 1000, the sensed position of each probe is collected in real time. The backlight on the camera 1011 provides enhanced lighting inside of the shoe so that the scanned positions can be recognized more accurately. The measurement results are presented as a cloud of points, from which a CAD (obj) file is created.

The images obtained from the camera will show the flat marking strip and indicators of the probes 1006, making it possible to process them using software in order to obtain the coordinates of the points of the scanned object. Probes with indicators can be found in an image by using the G color channel of the RGB (red, green, blue) image format. The search is performed in two steps. First, the green-colored pixels are memorized by means of a full scanning. Then, the round-shaped areas that contain the maximum number of green pixels are found among them using the Monte Carlo method (a radius of 5 pixels on an image size 640×480 pixels). After locating the first indicator, the green pixels that belong to it, are removed from the main image and a search for the next image begins. When it proves impossible to find another round area filled with green pixels, the number of indicators in sight will be determined. The video recording is stopped when this number is substantially reduced (in specifically, from 8 to 3), which implies the straightening of the probes as the device exits the cavity being measured.

In each image, the probe indicators make it possible to acquire information about the cross-sections of the interior surface. And then, from a sequence of images a multitude of interior surface cross-sections—a point cloud can be obtained. A flat marking strip is used to align the cross-sections relative to one another, making it possible to state the location of each measured cross-section in space with a high degree of accuracy.

There are at least three opening modes of the probes with indicators 1006: close, half open (50%), wide open (angle 100 degrees). Scanning of the user's footwear can be done with the probes in a different opening mode and consequently with a different level of pressure inside the shoe. After several rounds of scanning the footwear with different levels of pressure on the probes, the expansion rigidity of the shoe vamp can be calculated. The inner surface relays the resistance of the cross sections of the footwear around the metatarsophalangeal joint when the shoe shape changes. This tightness appears when a person is standing or walking and different pressures of the rear and lateral parts of the foot are applied to the vamp of a shoe.

Besides, a 3D model of worn, old user's shoes can be obtained with the scanner device 1000. Then the 3D model of the new shoes and the 3D model of the used shoes can be compared, providing information about which parts of the shoe are deformed when wearing. This information provides understanding how the whole material of the shoe (not just the top of the shoe vamp) is deformed and allows predicting how new shoes will deform during use. This method for scanning the user's present shoes can provide data about the stiffness of different sections of the shoes, which then can be used for the modification of the topological 3D model during the process of the virtual fitting. This data, together with the information about the elasticity of a particular vamp material of a shoe, and the information about how a person's foot moves, allows the measuring of the comfort level of the shoe for a particular user with a high degree of accuracy.

The additional information about the stiffness of the inner surface of a shoe, i.e. how the shoe is deformed under pressure from the inside, allows building a "smarter" 3D model than the ones achieved from the traditional 3D models. All the above is mentioned in paragraphs [00095] and [00096] adding new information to our topological 3D model, making in better than conventional 3D models.

Figure 11:
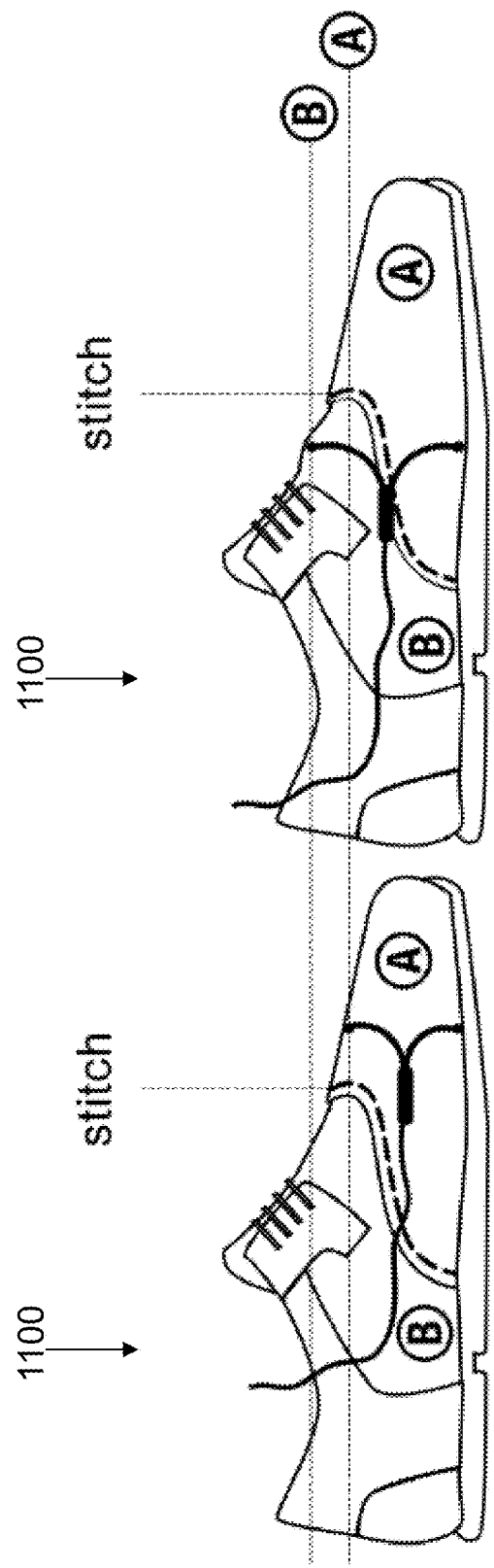
FIG. 11 demonstrates the effect of stitches on a shoe's inner surface and its measurement, in accordance with this application.

FIG. 11 shows flexibility in show material that can affect comfort. The difference in shoe 1100 vamp stretching with different materials is demonstrated. By measuring the spacer stiffness of each part of shoes, we can obtain information about the flexibility of the material from which this part is made, the presence and location of the stich that affect comfort. Accurate measuring of the stretching of a particular person's shoe can be taken into consideration in designing customized shoes, and in noting the comfort of a given shoe before purchase. A toecap made of material A is stitched to a vamp made of material B via a stitch. The stretching of material A in line A is more forward. The stretching of material B in line B is more convex when compared to the stretching of material A. This indicates that material A is stiffer than material B.

Figure 12:
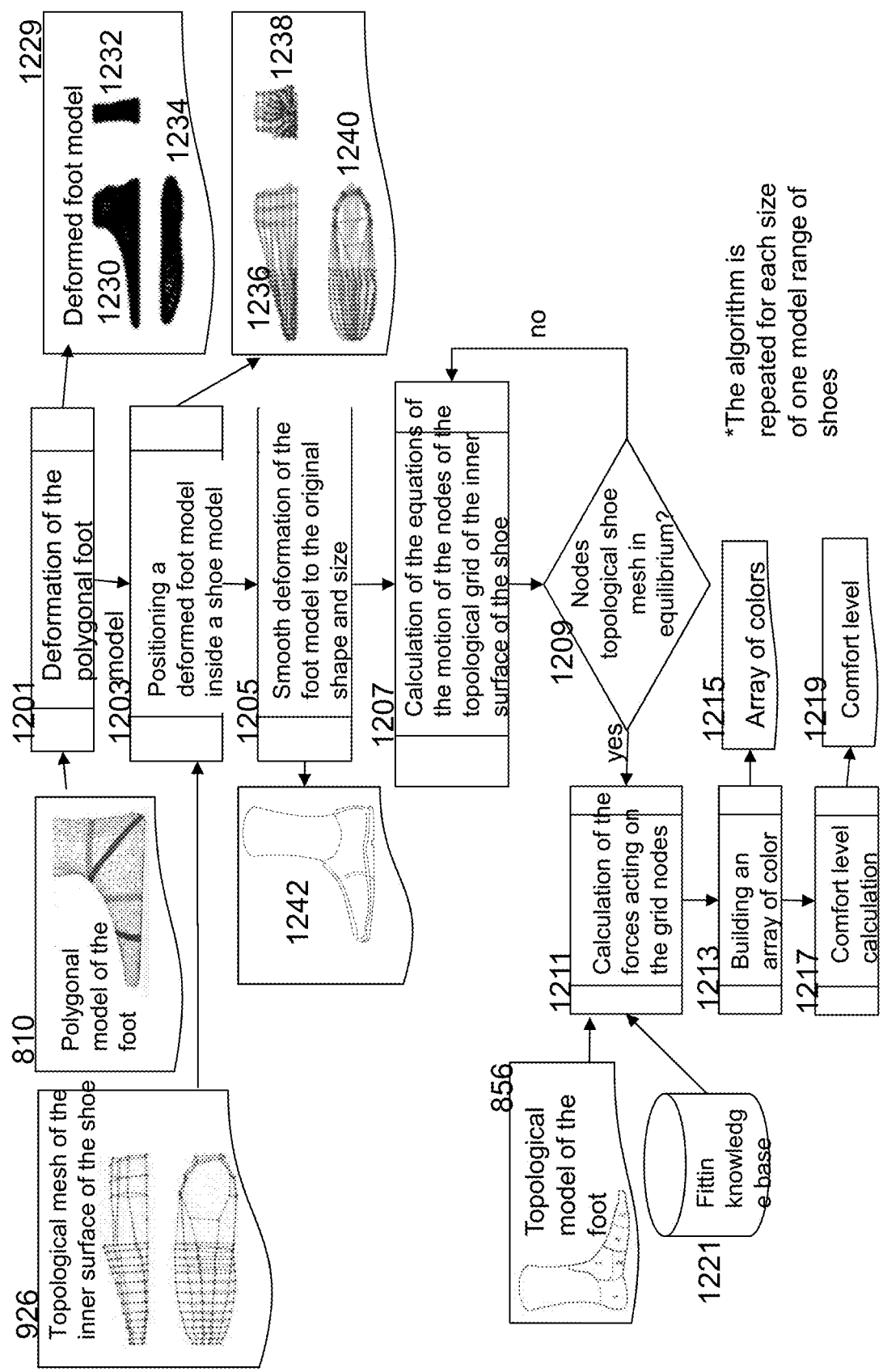
FIG. 12 shows a flowchart for calculating the comfort level of a 3D foot model inside a topological shoe model, in accordance with this application.

FIG. 12 shows a flowchart for calculating the comfort level of a 3D foot model inside a topological shoe model, in accordance with the application. With the model of the shoe and the model of the foot of a user, the next process for measuring the comfort level of a shoe and choosing a comfortable shoe is a virtual fitting and the simulation of the foot and the shoe interacting during motion. In reference to FIG. 12, in step 1201 the obtained user's foot model 810 is zoomed out: reduced in width, length and height, resulting in a deformed foot model 1229 is shown in three views: front 1230, right side 1232 and top 1234. In step 1203 these deformed foot models are then embedded into the topological mesh of the inner surface of the shoe 926, the result is shown in three views: front 1236, right side 1238 and top 1240. The deformed foot model 1229 may be further aligned inside the shoe model. In step 1205 after fitting a foot model into a shoe model and aligning it, then the foot is zoomed in up to its original size. The result is shown in view 1242. The foot model will not be deformed any more. Now the topological mesh of the inner surface of the shoe is deformed, fitting tightly the foot model. Step 1207 when the nodes of the topological mesh of a shoe move, and the forces are calculated continuously, the calculation is repeated until the forces are balanced. The algorithm and calculation continues while the shoes mesh vertex moves. When all the forces are balanced, and the shoes mesh vertex are stopped based on the topological model of the foot 856 the forces acting on the grid nodes are calculated in step 1211. Depending on the amount of force in each vertex of the polygonal model of the foot, an array of color is built (in step 1213) and the level of comfort is calculated (in step 1217).

The calculation of forces takes into consideration such factors as the shoe vamp materials, the presence of shoelaces, the type of footwear, and others factors provided from the shoe knowledge database 1221.

The simulation includes the foot motion and the cross-sections of a shoe. The foot, having a particular size and form, presses against a foot model, which has a certain resistance to it. Herein conditional forces are calculated between the vertex node points on the foot model and the topological shoe model. FIGS. 13A and 13B illustrate the interaction of the forces between two neighboring vertices of the topological mesh i and j upon their distance (FIG. 13A) and the bending forces during the shift of the central node i in the ijk triple (FIG. 13B). The forces calculated include the force of resilience and soft interactions of the nodes, the force of the interacting elements of the leg pressing on the nodes, the bending forces of the bonds when a node is displaced in relation to the neighboring nodes.

Figure 14:
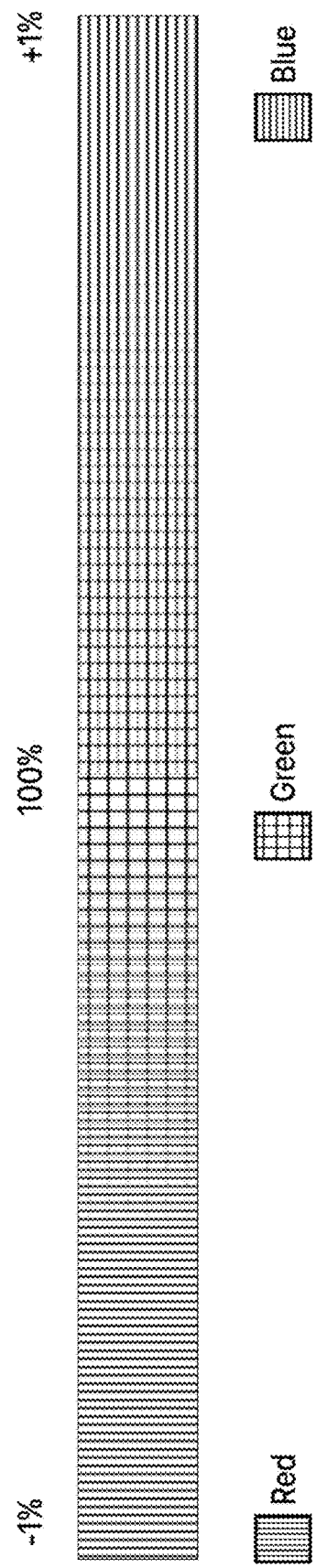
FIG. 14 shows an array of colors with designated values for mapping the comfort level on a foot model, in accordance with this application.

Then in every node of the topological model of the shoe, calculations are transferred to the foot models and the foots are colored. The level of comfort is calculated which is shown as a percentage from the ideal fitting. This is illustrated by an array of colors shown in FIG. 14. If this value equals 100%, that corresponds to green color the footwear fits perfectly.

Figure 15:
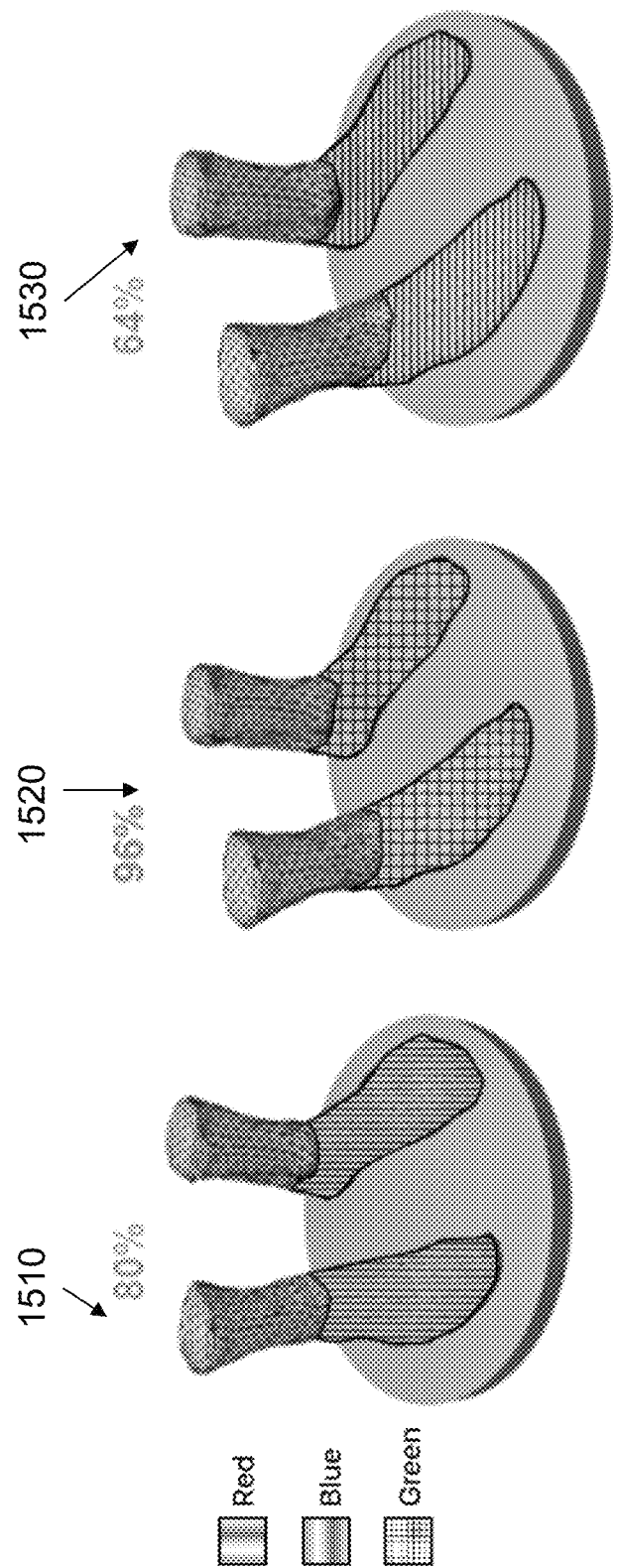
FIG. 15 demonstrates example 3D foot models colored per comfort levels after a virtual fitting inside particular shoes, in accordance with this application.

In each point of the polygonal model the level of comfort is colored, forming the array of colors. After visualization the fitting array of colors is transferred to the 3D-engine of the mobile app or to the web-widget, and the 3D models end up with a pigmented colored spectrum from blue to red. The color blue means that the footwear is too big, the color red signifies that the modeled footwear is too small. For example, in FIG. 15 the shoe model 1520 shows a 96% overall comfort level, the vertex points of the corresponding foot model are colored in green; shoe model 1510 shows an 80% overall comfort level, the corresponding vertex points of foot model are colored in red indicating too much pressure; shoe model 1530 shows a 64% overall comfort level, the corresponding vertex points of foot model are colored in blue indicating that the shoe is too big.

Figure 16A:
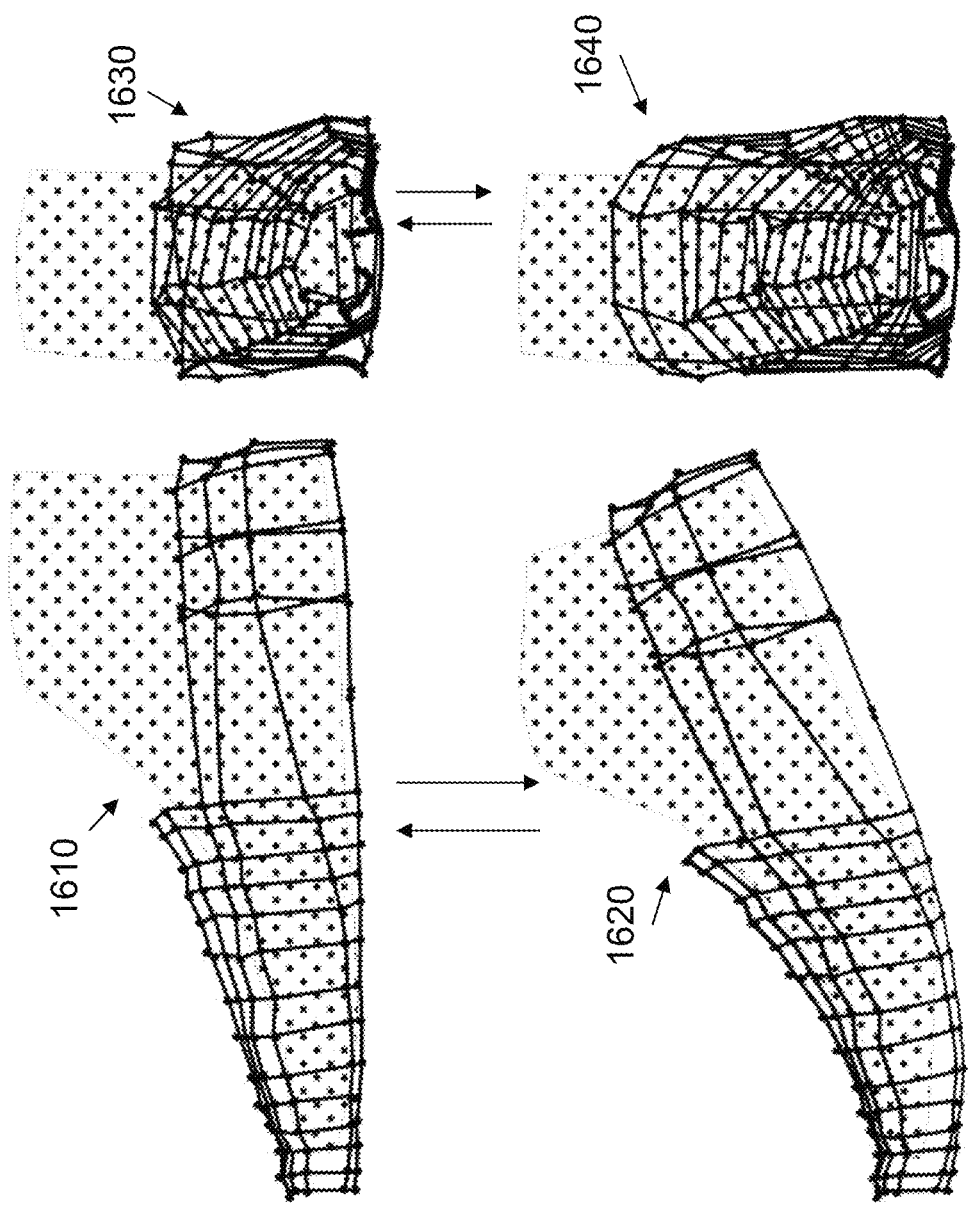
FIG. 16A demonstrates the simulation process of foot comfort level in foot motions, in accordance with this application.
Figure 16B:
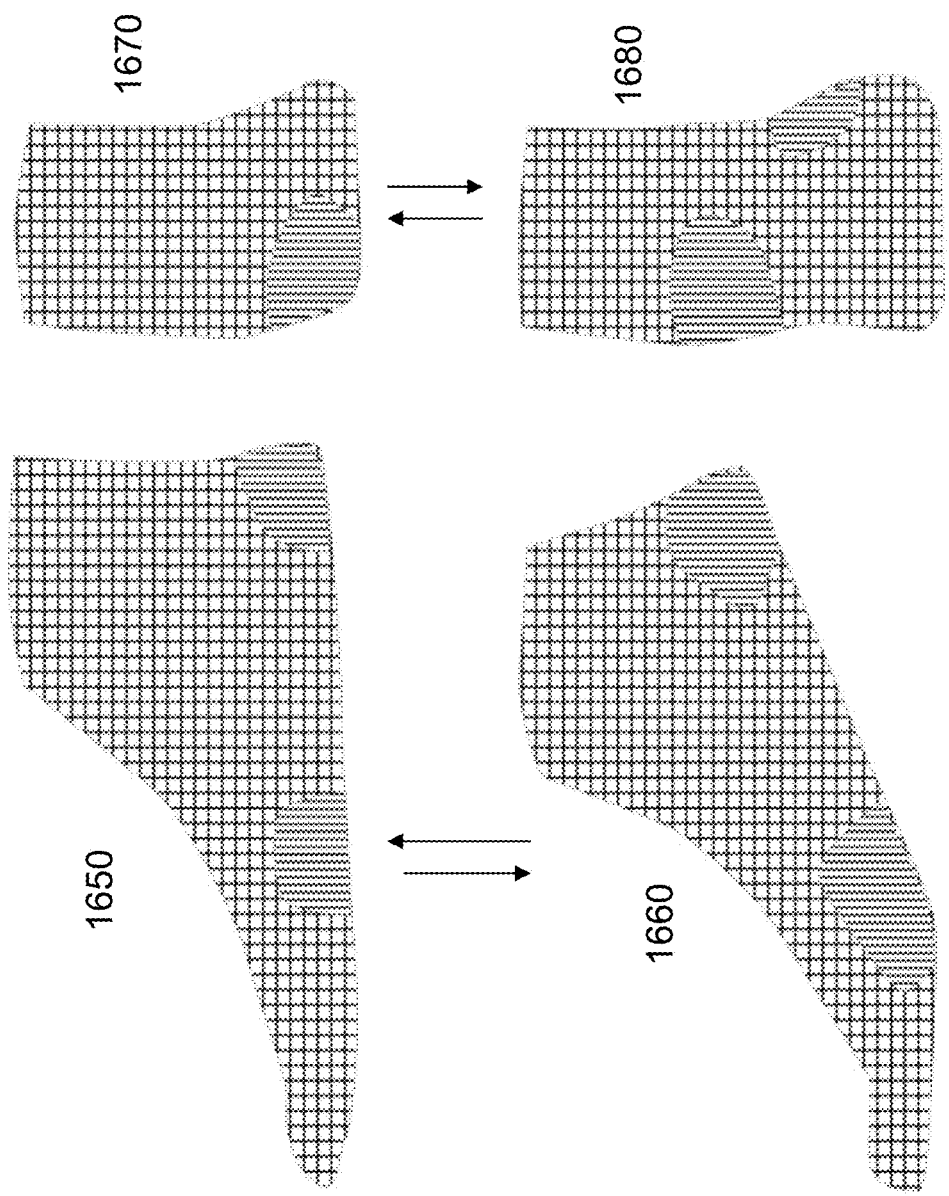
FIG. 16B demonstrates the coloration of a 3D foot model per the value of calculated forces in accordance with this application.

Besides foot model fitting in a static topological model of the footwear, the system and this method allows the simulation of footwear wearing process in a dynamic manner, such as in walking, running or in other activities for example, in ice skates, in snowboard, and football playing. FIG. 16A demonstrates that and the foot topological mesh retains its connections between the vertices during the lifting of the foot. In the front view of the foot model inside the shoe model moves from grounded position 1610 to a heel lifted position 1620. In the right side view, the foot model inside a shoe moves from the grounded position 1630 to a heel lifted position 1640. In FIG. 16B in the front view of the foot model inside the shoe model moves from a grounded position 1650 to a heel lifted position 1660. In the right side view, the foot model inside a shoe moves from the grounded position 1670 to a heel lifted position 1680. FIG. 16B demonstrates that a red area appears in the place of bending corresponding to increased forces and the bending of the mesh connections. In the simulation of a foot in motion, the cross-sections of a shoe, having a particular size and form, pressures against a foot model, having a certain resistance to it. Herein conditional forces are calculated between vertex node points on the foot model and the topological shoe model. The conditional forces calculated during simulation do not allow the topological model of the shoes to fly off the heel when moving. Even if the positions of the vertices of the graph are changed, all connections between them remain. Conditional forces calculated in simulation modelling do not allow the topological model of the footwear to fall of the heel when moving. This model can be reproduced in time.

A topological mesh model of shoes is a spatial topological model made with vectors, of the inner surface of a shoe, including a description of the vertices and topological relations (connections) between the vertices. The bonds between vertices do not change, the model can produce any type of deformation without breaking bonds. In mathematical terms, this is a graph. One of the properties of this graph, is that when the position of the nodes changes, the connection between them remains. The topological mesh is a spatial topological vector of the footwear's inner surface which comprises the description of vertices and topological connections between them. Besides spatial coordinates, each vertex of the topological footwear model contains additional information such as spreading stiffness of the upper part of the footwear and the interaction forces between node points, with allowances made for the footwear type, material of the footwear, the presence of laces, etc. For each of the factors mentioned there are special correction coefficients in the comfort level calculation. For instance, presence or absence of laces exerts significant influence upon the calculation of the pressure on the foot in the instep area.

This method of virtual fitting makes the footwear retail and purchase process simple, retailers can decrease the ratio of footwear returns dramatically due to size mismatches and other discomforts. Retailers can reduce delivery costs and consumers can choose their footwear without an in person fitting.

Using the existing models of shoes there is a possibility to create an individual suggestion system for the footwear that fits a user well. This invention changes the shoe buying procedure significantly, taking physical shoe stores, their sales assistants, and store keepers out of the Customer Journey Map. It will make the buying process more comfortable. There is no need to buy three pairs of the same shoe but in different sizes, like it often happens when it is done through the Internet. For the shoe making industry this method can help with footwear design and improve quality control. This system and method of measurement could be used for making items which provide a precise anatomical fit for certain human body parts, such as prosthetics, orthoses, and/or orthopedic insoles.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure covers modifications and variations of this disclosure provided they come within the scope of the appended claims and their equivalents.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle. The claims as filed are intended to be as comprehensive as possible, and NO subject matter is intentionally relinquished, dedicated, or abandoned.

What is claimed:

1. A method for the virtual footwear fitting and computationally measuring the comfort level of a shoe for a user's foot with a set of computer modules wherein computer modules including computer processor, hardware and memory chips, comprising the following actions:

placing a user's foot on or near a flat object of known size and shape to the computer modules;

photographing a user's foot on or near the flat object from different angles through a camera and obtaining an array of foot images containing a part of the user's leg and the flat object;

providing a client computer module for obtaining an array of foot images to meet a pre-defined requirement;

executing said client module or a server computer module to process the obtained array of foot images and to turn the obtained array of foot images into black and white images as an array of processed foot images in order to detect the flat object's contour and the user foot's contour;

providing a computer module for identifying the flat object's contour using a template and the Monte Carlo method for the array of processed foot images;

providing a computer module for calculating the camera's position and angle for each of said array of processed foot images using the flat object's contour;

providing a computer module for defining the user's foot contour using the calculated camera position and angle from each of the said images;

providing a computer module for chipping away from an initial voxel box an excessive voxel whose projection from the calculated camera position is beyond the user's respective foot contours in the array of processed foot images, generating a set of remaining voxel;

providing a computer module for constructing a user's 3D voxel foot model from the set of remaining voxel of said initial voxel box, and converting the user's 3D voxel foot model into a user's 3D polygonal foot model for storage;

providing a computer module for obtaining a topological foot with a foot knowledge database;

providing a computer module for obtaining a vertex topological shoe inner space model;

providing a computer module for fitting the user's 3D polygonal foot model into the said vertex topological shoe inner space model by zooming in and out said user's 3D polygonal foot model to insert it into said shoe inner space model; and providing a computer module for virtual fitting said vertex topological shoe inner space model and the user's 3D topological foot model and computationally measuring a comfort level of the shoe for the user's foot by calculating of virtual forces acting on a set of grid nodes of the inner topological shoe space model.

2. The method of claim 1, further comprising the action of:

providing a computer module for calculating a comfort level of the shoe for the user's foot by calculating virtual forces acting on a set of grid nodes of the inner shoe topological space model during a simulation of a footwear wearing process dynamically.

3. The method of claim 1, further comprising the actions of:

providing a computer module for accessing and retrieving a set of foot sensitivity information from the foot knowledge base based on the user's 3D polygonal foot model, and for applying to vertex points of the user's 3D polygonal foot model with the set of foot sensitivity information.

4. The method of claim 1, further comprising the actions of:

providing a computer module for detecting the foot contour in the array of processed foot images by calculating "physical interaction" between the image points after applying an attractive and a bending force.

5. The method of claim 1, wherein the action of photographing is performed by a mobile device and the client computer module is installed on the mobile device.

6. The method of claim 5, wherein the client computer module is installed on a computer including a single board computer.

7. The method of claim 1, wherein multiple comfort levels are calculated and are expressed in a range of colors.

8. The method of claim 7, wherein the colors of multiple comfort levels are mapped to the user's 3D polygonal foot model.

9. The method of claim 1, wherein the user's 3D voxel foot model is further enhanced by applying anti-aliasing process to eliminate ridges and jaggy appearance on the voxel foot model surface.

10. The method of claim 1, further comprising the action of: providing a computer module to measure a length, a width and a girth of the user's 3D polygonal foot model.

11. The method of claim 1, further comprising the action of:

providing a computer module for fitting the user's topological foot model to the shoe's topological inner space model in motion while virtual forces at each of the vertex of the user's topological foot model are calculated; and when equilibrium virtual forces at the vertex points in motion are reached and calculating a comfort level based on the equilibrium virtual forces at each of the vertex points.

12. The method of claim 11, wherein the equilibrium virtual forces are modified with a corresponding weight factor reflecting anthropometric sensitive characteristics of a foot at each of the polygon of the user's topological foot received from a foot knowledge base.

13. The method of claim 11, wherein the equilibrium virtual forces are modified with a corresponding weight factor reflecting the shoe's structure, material, and lace information retrieved from a shoe knowledge database.

14. The method of claim 1, wherein said vertex topological model of the shoe's inner surface is constructed by a shoe scanning computer module from a set of scanned images or video stream generated by a shoe scanner device.

15. The method of claim 14, wherein the said shoe scanner device is configured with a set of multiple sensor shank probes, each shank probe equipped with an indicator, a camera, lens and a backlight, and the set of shank probes are configured to open at different angles that can apply pressure to the inner surface of a shoe.

16. The method of claim 15, further comprising an action of:

providing a computer module for retrieving information about shoe types, stiffness, material, vamp, and shoelaces from a shoe database, and for applying the vertex points of said vertex topological model of the shoe's inner surface with this information.

17. The method of claim 15, wherein said computer module for shoe's inner space calculates flexibility and elasticity of a shoe vamp by using scanning images obtained with different pressures created by the shank probes and by scanning the inner surface of a shoe with different opening angles of the shank probes.

18. The method of claim 1, further comprising an action of:
   providing a computer module for receiving a second vertex topological model of a used shoe of a user for comparing the comfort levels of said vertex topological model of the shoe's inner surface with the comfort levels of said second vertex topological model of the used shoe to produce a comparison result for providing consumer suggestions.

19. The method of claim 18, wherein the comfort level of the second vertex topological model of a used shoe's inner surface is used for designing customized shoes.

* * * * *